US012356170B2

(12) United States Patent
Zhang et al.

(10) Patent No.: US 12,356,170 B2
(45) Date of Patent: Jul. 8, 2025

(54) TRANSDUCER ASSEMBLY AND ASSOCIATED SIGNAL PROCESSING

(71) Applicant: Dolby Laboratories Licensing Corporation, San Francisco, CA (US)

(72) Inventors: Pengfeng Zhang, Shanghai (CN); Hui Yang, ShenYang (CN); Nengkun Lv, Shenzhen (CN)

(73) Assignee: Dolby Laboratories Licensing Corporation, San Francisco, CA (US)

(*) Notice: Subject to any disclaimer, the term of this patent is extended or adjusted under 35 U.S.C. 154(b) by 226 days.

(21) Appl. No.: 18/012,378

(22) PCT Filed: Jul. 7, 2021

(86) PCT No.: PCT/CN2021/105054
§ 371 (c)(1),
(2) Date: Dec. 22, 2022

(87) PCT Pub. No.: WO2022/007860
PCT Pub. Date: Jan. 13, 2022

(65) Prior Publication Data

US 2023/0269539 A1 Aug. 24, 2023

Related U.S. Application Data

(60) Provisional application No. 63/177,560, filed on Apr. 21, 2021, provisional application No. 63/068,037, filed on Aug. 20, 2020.

(30) Foreign Application Priority Data

Jul. 7, 2020 (WO) ................ PCT/CN2020/100700
Jun. 29, 2021 (WO) ................ PCT/CN2021/103094

(51) Int. Cl.
*H04R 9/04* (2006.01)
*H04R 7/04* (2006.01)
*H04R 9/06* (2006.01)

(52) U.S. Cl.
CPC ............... *H04R 9/046* (2013.01); *H04R 7/04* (2013.01); *H04R 9/043* (2013.01); *H04R 9/06* (2013.01);
(Continued)

(58) Field of Classification Search
CPC .......... H04R 9/046; H04R 7/04; H04R 9/043; H04R 9/06; H04R 2201/028;
(Continued)

(56) References Cited

U.S. PATENT DOCUMENTS 6,594,372 B2 7/2003 Nakaso
7,551,749 B2 6/2009 Rosen
(Continued)

FOREIGN PATENT DOCUMENTS

CN 209267799 U 8/2019
GB 2548492 B 9/2018
(Continued)

*Primary Examiner* — Tuan D Nguyen

(57) ABSTRACT

Example embodiments disclosed herein relate to a transducer assembly and associated signal processing. A transducer assembly includes two voice coils in a telescopic arrangement and having unequal sizes, and two suspension systems connected to the two voice coils, respectively. The two voice coils extend in opposites directions from their suspension systems. Dimensions of respective wires of the two voice coils are determined based on respective magnetic flux densities in magnetic gaps for receiving the two voice coils. As a result, a residual vibration caused by the unequal-sized voice coils can be further reduced.

28 Claims, 17 Drawing Sheets

(52) U.S. Cl.
CPC .... *H04R 2201/028* (2013.01); *H04R 2430/01* (2013.01)

(58) Field of Classification Search
CPC .......... H04R 2430/01; H04R 2209/026; H04R 9/025; H04R 9/063; H04R 2209/027; H04R 2499/11
See application file for complete search history.

(56) References Cited

U.S. PATENT DOCUMENTS

| | | | | |
|---|---|---|---|---|
| 8,379,887 | B2 | 2/2013 | Kasai | |
| 8,699,728 | B2 | 4/2014 | Kasai | |
| 9,660,596 | B2 | 5/2017 | Whitwell | |
| 9,693,167 | B2 | 6/2017 | Honda | |
| 10,250,994 | B2 | 4/2019 | Griffiths | |
| 10,412,502 | B2 | 9/2019 | Ishii | |
| 10,631,096 | B1 | 4/2020 | Garcia Selva | |
| 10,979,801 | B2 | 4/2021 | Fallon | |
| 2003/0048920 | A1 | 3/2003 | Van Halteren | |
| 2005/0271226 | A1 * | 12/2005 | Tanabu | H04R 9/063 381/396 |
| 2006/0188126 | A1 | 8/2006 | Andersen | |
| 2007/0041606 | A1 | 2/2007 | Sheppard | |
| 2017/0272866 | A1 | 9/2017 | Griffiths | |
| 2019/0364365 | A1 | 11/2019 | Nevill | |

FOREIGN PATENT DOCUMENTS

| | | | |
|---|---|---|---|
| KR | 2014094940 | A | 7/2014 |
| WO | 2005087391 | A2 | 9/2005 |
| WO | 2014072299 | A1 | 5/2014 |
| WO | 2014164573 | A1 | 10/2014 |
| WO | 2015193564 | A2 | 12/2015 |
| WO | 2019086357 | A1 | 5/2019 |

* cited by examiner

TRANSDUCER ASSEMBLY AND ASSOCIATED SIGNAL PROCESSING

CROSS-REFERENCE TO RELATED APPLICATIONS

This application is the U.S. national stage entry of International Patent Application No. PCT/CN2021/105054, filed Jul. 7, 2021, which claims priority to International Patent Application No. PCT/CN2021/103094, filed Jun. 29, 2021, U.S. Provisional Patent Application 63/177,560, filed Apr. 21, 2021, U.S. Provisional Patent Application 63/068,037, filed Aug. 20, 2020, and International Patent Application No. PCT/CN2020/100700, filed on Jul. 7, 2020, all of which are incorporated herein by reference in their entirety.

FIELD OF THE INVENTION

Example embodiments disclosed herein generally relate to electroacoustic transducers, and more specifically, to a transducer assembly and associated signal processing.

BACKGROUND

Transducers such as speakers (loudspeakers) are widely used in electronic devices. Conventional transducers vibrate during operation, transferring energy to a frame and causing system vibration. In the embedded speaker system such as the laptop and television with many loose parts such as the printed circuit board (PCB), keyboard, and touch pad, the vibration noise caused by the energy transfer from the transducer can be a serious issue. Speaker designers have to make trade off to lower the speaker performance for a clear sound with a reduced vibration noise. There is a need for improved transducers that provide improved vibration performance.

SUMMARY

Example embodiments disclosed herein propose a solution for vibration cancellation in a transducer assembly.

In a first aspect, example embodiments disclosed herein provide a transducer assembly. The transducer assembly includes a first voice coil and a second voice coil, the first and the second voice coils having different sizes and being arranged in a telescopic arrangement; a first suspension system connected to the first voice coil, the first voice coil being disposed to extend from the first suspension system in a first direction; a second suspension system connected to the second voice coil, the second voice coil being disposed to extend from the second suspension system in a second direction opposite to the first direction; and a magnet system defining a first magnetic gap for at least partially receiving the first voice coil and a second magnetic gap for at least partially receiving the second voice coil. Respective wires of the first and the second voice coils are dimensioned based on respective magnetic flux densities in the first and the second magnetic gaps.

In a second aspect, example embodiments disclosed herein provide a signal processing method. The method includes receiving an input audio signal; processing the input audio signal in a first signal path and in a second signal path, respectively, to generate a first output audio signal for a first voice coil and a second output audio signal for a second voice coil of a transducer assembly, the first and the second output audio signals having different energy levels; and providing the first output audio signal and the second output audio signal to the first voice coil and the second voice coil, respectively, to excite the first and the second voice coils. The first voice coil is connected to a first suspension system and is disposed to extend from the first suspension system in a first direction, and the second voice coil is connected to a second suspension system and is disposed to extend inwardly in a second direction opposite to the first direction, and wherein the first and the second voice coils have different sizes and are arranged in a telescopic arrangement.

In a third aspect, example embodiments disclosed herein provide a speaker system. The speaker system includes a signal processing system configured to perform the method of the second aspect and a transducer assembly of the first aspect.

Other advantages achieved by example embodiments disclosed herein will become apparent through the following descriptions.

DESCRIPTION OF DRAWINGS

Through the following detailed description with reference to the accompanying drawings, the above and other objectives, features and advantages of example embodiments disclosed herein will become more comprehensible. In the drawings, several example embodiments disclosed herein will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
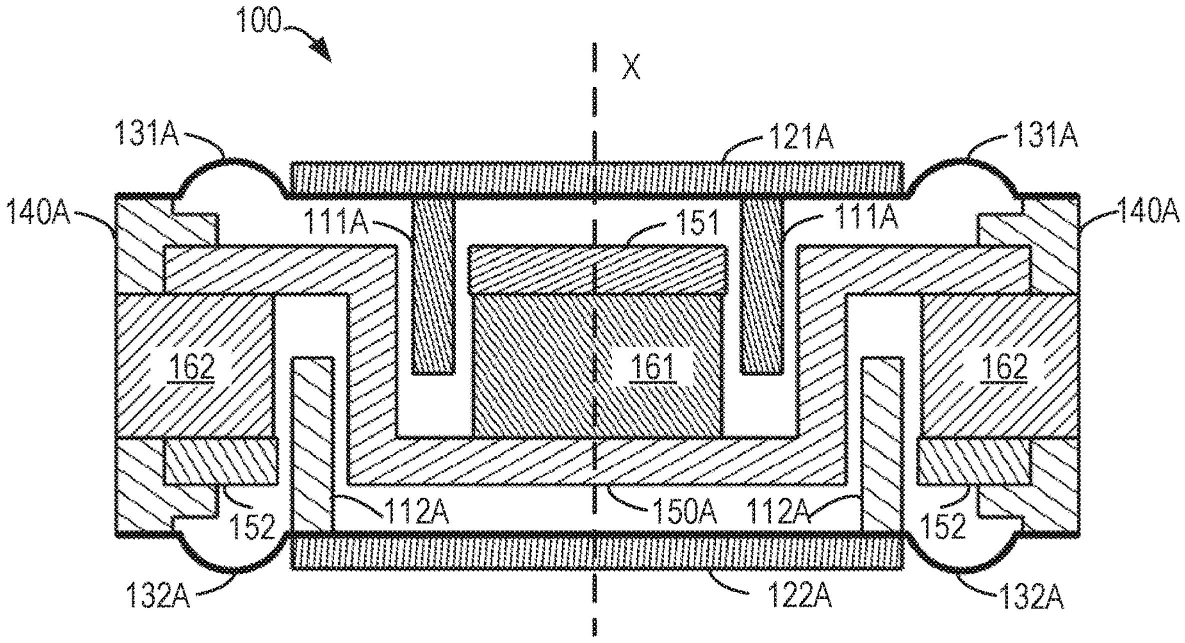
FIG. 1 illustrates a cross-sectional view of a transducer assembly in accordance with some example embodiments disclosed herein.

Principles of example embodiments disclosed herein will now be described with reference to various example embodiments illustrated in the drawings. It should be appreciated that depiction of those embodiments is only to enable those skilled in the art to better understand and further implement example embodiments disclosed herein and is not intended for limiting the scope disclosed herein in any manner.

In the following description and claims, unless defined otherwise, all technical and scientific terms used herein have the same meaning as commonly understood by one of ordinary skills in the art to which this disclosure belongs.

As used herein, the term “includes” and its variants are to be read as open-ended terms that mean “includes, but is not limited to.” The term “or” is to be read as “and/or” unless the context clearly indicates otherwise. The term “based on” is to be read as “based at least in part on.” The term “one example embodiment” and “an example embodiment” are to be read as “at least one example embodiment.” The term “another embodiment” is to be read as “at least one other embodiment”. The terms “first,” “second,” and the like may refer to different or same objects.

In a conventional single-coil transducer, a voice coil is attached to a diaphragm which is connected with a frame of a chamber within which the transducer is placed. When applying an audio signal to the voice coil, a corresponding current passes through the voice coil and the resultant force is transmitted to the diaphragm, causing it to vibrate to produce or transmit sound waves. An equal force acts on the frame of the chamber to make it vibrate in the opposite direction. If the chamber is rigidly fixed to other structures, then it too will be excited by the reaction force. As a result, the forces applied to the chamber and other structures may result in excessive vibrations, which can be acoustically perceived as unwanted buzzes and rattles, or can cause degrade frequency response of the radiated sound.

A dual-coil transducer design has been proposed. The transducer includes two voice coils that are aligned with each other. The two voice coils vibrate in opposite directions when an audio signal is provided. The opposite movements of the two voice coils would help cancel out the vibrations on the frame. However, such a transducer is generally too thick to be placed in some small-sized electronic devices which have limited spaces for placing the transducer assembly.

In order to solve the problems of the conventional transducers, there is a need for a transducer which can be constructed to have a thin profile and to reduce or cancel the undesired vibrations caused by the transducer.

In accordance with example embodiments disclosed herein, a solution for vibration cancellation in a transducer assembly is provided. In this solution, the transducer assembly includes two voice coils in a telescopic arrangement and having unequal sizes, and two suspension systems connected to the two voice coils, respectively. The telescopic arrangement allows a thickness of the transducer assembly to be decreased as compared with the conventional dual-coil design. The two voice coils extend in opposites directions from their suspension systems. As such, the two voice coils are excited to vibrate in opposite directions, which may cancel vibration of a frame to which the two voice coils are connected. Dimensions of respective wires of the two voice coils are determined based on respective magnetic flux densities in magnetic gaps for receiving the two voice coils. As a result, a residual vibration caused by the unequal-sized voice coils can be further reduced.

In some example embodiments, the two suspension systems and a shared magnet system may be optimized to further reduce the residual vibration based on the given dimensions. In some example embodiments, the residual vibration may be further complemented by processing an input audio signal into two output audio signals with different energy levels and applying the two output audio signals to the voice coils, respectively.

Example embodiments disclosed herein will be described in detail below with reference to the accompanying drawings.

FIG. 1 illustrates a cross-sectional view of a transducer assembly 100 in accordance with some example embodiments disclosed herein. As shown, the transducer assembly 100 includes a voice coil 111A, a voice coil 112A, a diaphragm plate 121A, a diaphragm plate 122A, a diaphragm 131A, a diaphragm 132A, and a frame 140A. The frame 140A defines a space therein to accommodate other components of the transducer assembly 100.

Two suspension systems are provided to connect the voice coils 111A and 112A to the frame 140A, respectively. In the example embodiments of FIG. 1, the suspension system for the voice coil 111A includes the diaphragm plate 121A and the diaphragm 131A attached thereto, and the suspension system for the voice coil 112A includes the diaphragm plate 122A and the diaphragm 132A attached thereto. The diaphragm plates 121A and 122A may be arranged in parallel and have the same or different sizes. The diaphragm plate 121A and the diaphragm 131A cover an open end of the frame 140A, with the diaphragm 131A suspending at its edge from the frame 140A. The diaphragm plate 122A and the diaphragm 132A cover an opposite open end of the frame 140A, with the diaphragm 132A suspending at its edge from the frame 140A. In some examples, the diaphragms 131A and 132A may be constructed of membranes.

The transducer assembly 100 further includes a magnet system shared by the voice coils 111A and 112A. The magnet system is disposed within the space defined by the frame 140A to define respective magnetic gaps for at least partially receiving the voice coils 111A and 112A. A magnetic field is created in the magnetic gaps to drive movements of the voice coils 111A and 112A. Thus, the magnet system operates as a motor system for the voice coils 111A and 112A.

In the example embodiments of FIG. 1, the magnet system includes a center magnet 161 and a side magnet 162. The center magnet 161 is disposed at a middle part of the space defined by the frame 140A. The side magnet 162 is symmetrically disposed at two opposite sides of the center magnet 161 and has a distance from the center magnet 161.

In the shown example, the side magnet 162 is partially embedded within a wall of the frame 140A.

In some example embodiments, the transducer assembly 100 may further include a yoke 150A suspending from the frame 140A to attach the magnet system to the frame 140A. In some example embodiments, the magnet system may further include a top plate 151 attached to a top surface of the center magnet 161 and a side plate 152 attached to a bottom surface of the side magnet 162. A bottom surface of the center magnet 161 is attached to the yoke 150A. The voice coils 111A and 112A are at least partially received in the corresponding magnetic gaps defined by the yoke 150A, the top plate 151, and the side plate 152. The yoke 150A may be of a pot shape, with the center magnet 161 posited in its central region. The yoke 150A may also extend into the wall of the frame 140A and attach to at least partially the top surface of the side magnet 162.

Under the action of the magnetic field in the magnetic gaps, the voice coils 111A and 112A can be excited and vibrate when input audio signals are applied thereto. The vibrations of the voice coils 111A and 112A may in turn move the diaphragms 131A and 132A back and forth, respectively, to project sound waves. In the example transducer assembly 100 illustrated in FIG. 1, the voice coil 111A, the diaphragm plate 121A, the diaphragm 131A, and the center magnet 161 operate as a first transducer, and the voice coil 112A, the diaphragm plate 122A, the diaphragm 132A, the side magnet 162 operate as a second transducer which vibrates in an inverse direction of the first transducer. The first transducer and the second transducer share the same magnet system comprising the center magnet 161 and the side magnet 162.

According to the example embodiments disclosed herein, the voice coils 111A and 112A have different sizes and are arranged in a telescopic arrangement. The voice coil 111A extends inwardly from the diaphragm plate 121A in one direction, and the voice coil 112A extends inwardly from the diaphragm plate 122A in an opposite direction. With such an arrangement, by applying an audio signal (s) to the two voice coils 111A and 112A, they can vibrate in substantially opposite directions, causing the diaphragm 131A and the diaphragm 132A to move in substantial opposite directions. The opposite movements can reduce the vibration forces transferred to the frame and thus reduce undesired resultant vibration of the frame.

In some example embodiments, the unequal-sized voice coils 111A and 112A may be center-aligned, for example, aligned to the X-axis as illustrated in FIG. 1. In some example embodiments, the voice coils 111A and 112A each have enclosed shapes with different diameters. For example, the voice coils 111A and 112A may be circular, annular, square, rectangle, or oval in shape, or may be any other shapes. In some example embodiments, the voice coil 111A may have a smaller size (for example, a smaller diameter) than the voice coil 112A such that the voice coil 112A is outward to the voice coil 111A, as illustrated in the example of FIG. 1. In some example embodiments, the two voice coils of the transducer assembly 100 may have a different size configuration, as will be described with reference to FIGS. 5A-5B and 6A-6C.

The telescopic arrangement of the voice coils 111A and 112A, on one hand, allows the profile of the transducer assembly 100 to be slimmer while leaving enough space for the voice coils 111A and 112A to vibrate. The voice coils 111A and 112A may be disposed to have a relatively short or even zero distance between their top ends in their respective extension direction along the X-axis. In some examples, the voice coils 111A and 112A may be even considered being overlapped in the direction along the X-axis, to further reduce the thickness of the transducer assembly 100 along the X-axis. The reduced thickness allows the transducer assembly 100 to be embedded into a device with a limited space for a speaker.

On the other hand, due to the asymmetry in size, the voice coils 111A and 112A may be excited to cause unequal vibration forces with the use of the shared magnet system, resulting in an undesired residual vibration force on the frame. According to embodiments of the present disclosure, it is expected that magnetic fluxes in the magnetic gaps for the voice coils 111A and 112A are equal or have a small difference, for example, a difference lower than a predetermined flux difference threshold. As such, the vibrations of the voice coils 111A and 112A may be substantially equal, resulting in substantially equal vibration forces transferred to the frame. The flux difference threshold for the magnetic fluxes may be set to any acceptable or tolerable value as required in the applications for the transducer assembly. Herein, for the purpose of discussion, the use of "substantially equal" or "substantially the same" indicates that two values are equal or has a difference lower than a predetermined threshold (which may be configured depending on the acceptable or tolerable difference in different applications).

To achieve the substantially equal magnetic fluxes, according to embodiments of the present disclosure, wires of the voice coils 111A and 112A can be dimensioned based on respective magnetic flux densities (represented as "B") in the magnetic gaps for receiving the voice coils 111A and 112A. Generally speaking, the magnetic flux in a magnetic gap is corresponding to a product of the magnetic flux density "B" and a length (represented as "L") of a wire of a voice coil. The magnetic flux densities in the respective magnetic gaps may be different with the use of the shared magnet system. Thus, the respective lengths of the wires of the voice coils 111A and 112A may be determined or manufactured to achieve the substantially equal magnetic fluxes.

In some example embodiments, the resistances of the voice coils 111A and 112A may be set to be the same, for example, to be a constant value. The resistance of a voice coil depends on a length of a wire of the voice coil, a resistance per unit length of the wire, and the number of coils when forming the voice coil. Thus, diameters of the respective wires of the voice coils 111A and 112A may be determined based on the respective magnetic flux densities in the magnetic gaps for receiving the voice coils 111A and 112A, in order to reach the suitable lengths of the wires of the voice coils 111A and 112A with the constant resistance. Different diameters of a wire may provide a different resistance per unit length of the wire. Thus, by selecting the diameters of the respective wires of the voice coils 111A and 112A, the suitable lengths of the wires of the voice coils 111A and 112A may be determined to achieve the substantially equal magnetic fluxes in the two magnetic gaps for the two voice coils.

In some cases, the weights of the suspension systems attached to the frame may also affect the vibration forces acted on the frame. As the weights of the voice coils 111A and 112A will be different due to their unequal sizes arranged in the transducer assembly 100 and their different diameters of the wires, the weights of their suspension systems may be adjusted to compensate for the weight difference between the voice coils 111A and 112A. In some example embodiments, a total weight of the voice coil 111A and the suspension system for the voice coil 111A may be set to be substantially equal to a total weight of the voice coil 112A and the suspension system for the voice coil 112A, which means that a difference between the two total weights may be equal or lower than a weight difference threshold. The weight difference threshold may be set to an acceptable or tolerable value.

As the weights of the voice coils 111A and 112A are limited by their dimensions, to achieve the substantially equal total weights, the weights for the two suspension systems may be adjusted based on the weights of the voice coils 111A and 112A. In some example embodiments, in the case that the suspension systems as illustrated in FIG. 1, the diaphragm plates 121A and 122A may be provided to be different in weights so as to compensate for the weight difference between the voice coils 111A and 112A. In some examples, the thickness and/or materials of the diaphragm plates 121A and 122A may be different to allow for the weight compensation. The selection of the diaphragm plates 121A and 122A may also take the influence on speaker performance of the transducer assembly 100 into account.

Different values of the mechanical compliance (represented as "Cms"), mechanical stiffness (represented as "Kms"), and/or mechanical resistance (represented as "Rms") for the two sides at the voice coils 111A and 112A may result in different vibration forces acted on the frame. In some example embodiments, the diaphragms 131A and 132A may be manufactured to have substantially the same mechanical compliance Cms, mechanical stiffness Kms, and/or mechanical resistance Rms. In some examples, a difference between the diaphragms 131A and 132A in the mechanical compliance Cms, mechanical stiffness Kms, or mechanical resistance Rms, may be lower than a corresponding difference threshold. In some examples, the diaphragms 131A and 132A may be of the same material.

By optimizing the dimensions of the voice coils, the weights and/or the mechanical parameters (such as Cms, Kms, and/or Rms), it is possible to compensate for the unbalances caused by the telescopic arrangement of the unequal-sized voice coils 111A and 112A. As a result, substantially equal vibration forces may be transferred to the frame by the opposite movements of the voice coils 111A and 112A, resulting in vibration reduction or cancellation.

In some example embodiments, an input audio signal may be processed in a signal processing path to generate a same output audio signal, and the same output audio signal may be applied to the voice coils 111A and 112A in parallel, to excite the voice coils 111A and 112A. In this example, the output audio signal may be produced from a single amplifier in the signal processing path. In some example embodiments, the input audio signal may be processed in a signal processing path to generate a same output audio signal, which may be further provided to two independent amplifiers to generate two amplified output audio signals. The two amplified output audio signals may be provided to the voice coils 111A and 112A, respectively.

In some example embodiments, the signal processing on the input audio signal may be optimized to further reduce or minimize the undesired residual vibration force, which will be discussed in detail below.

Figure 2:
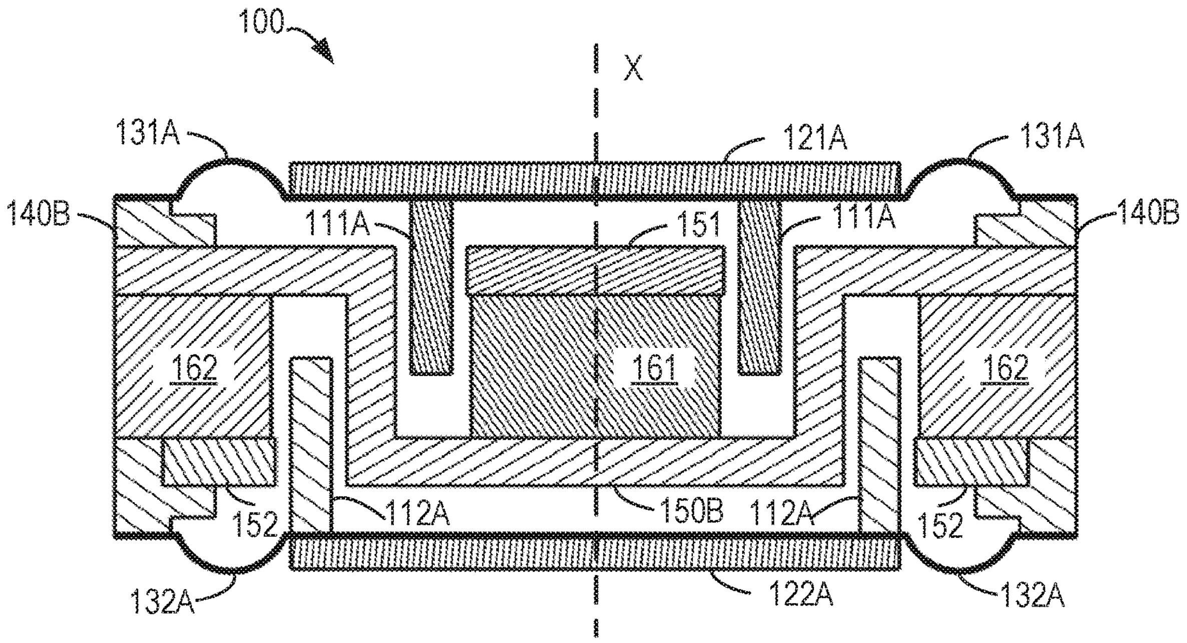
FIG. 2 illustrates a cross-sectional view of a transducer assembly in accordance with some further example embodiments disclosed herein.

FIG. 1 illustrates one example structure of the transducer assembly 100. In other example embodiments, the transducer assembly 100 may be constructed with other structures. Before describing the processing of the input audio signal in detail, some structure variants for the transducer assembly 100 are discussed first. The signal processing process described in the following may be applied to any of those structure variants. In some example embodiments, to enhance the mechanical structure strength and to optimize the assemble process, a yoke in the transducer assembly 100 may be extended through the sidewall of the frame. FIG. 2 illustrates such an embodiment of the transducer assembly 100. As illustrated, a yoke 150B is disposed in the transducer assembly 100 to support the magnet system. The yoke 150B has its side dimension elongated to extend through a sidewall of a frame 140B and cover fully the top surface of the side magnet 162.

Figure 3:
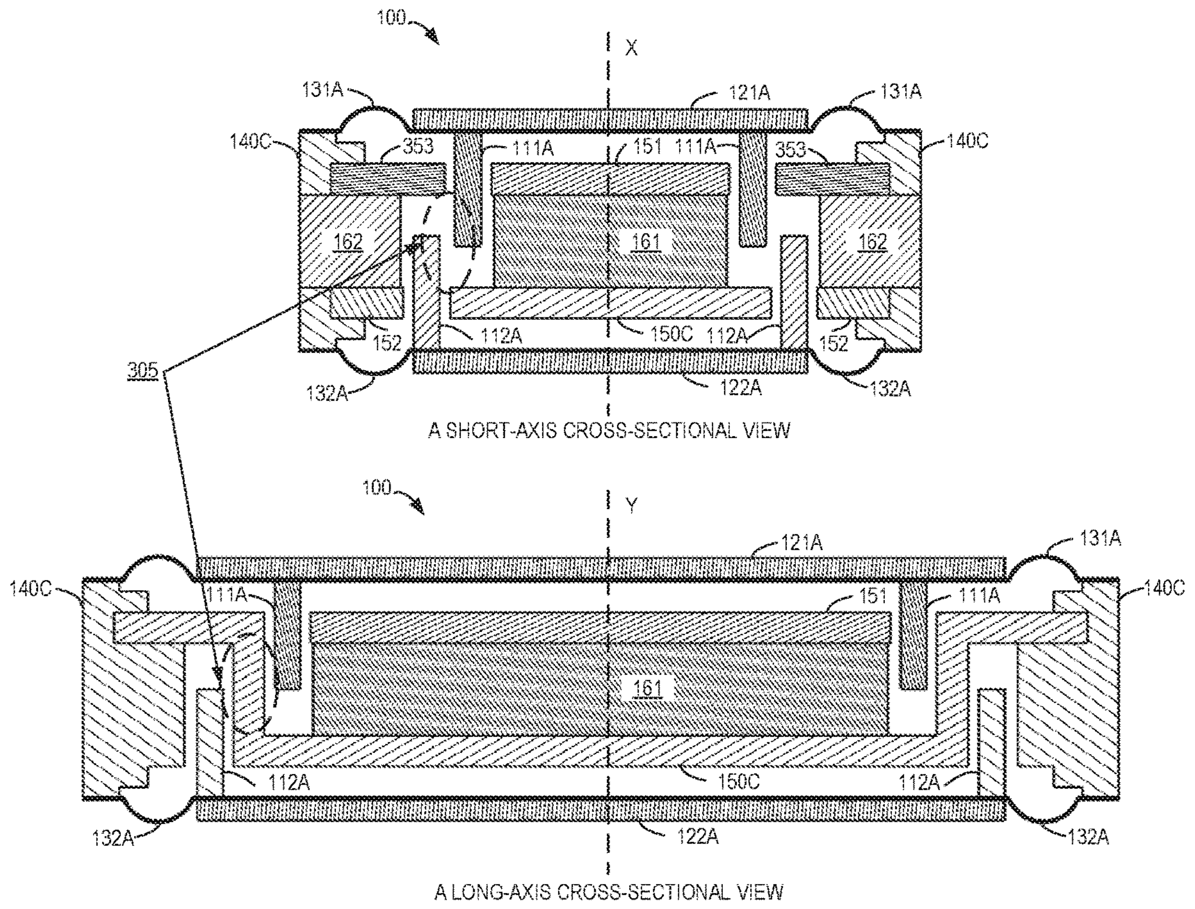
FIG. 3 illustrates a short-axis cross-sectional view and a long-axis cross-sectional view of a transducer assembly in accordance with some further example embodiments disclosed herein.

In some example embodiments, the frame of the transducer assembly may be designed to define a space with different sizes in different axes. As an example embodiment, the frame may be shaped to a rectangular box, an oval-shaped box, a spherical box, or the like. FIG. 3 illustrates a short-axis cross-sectional view (the upper view) and a long-axis cross-sectional view (the bottom view) of the transducer assembly 100 in accordance with some example embodiments. In the example of FIG. 3, a yoke 150C is disposed in the transducer assembly 100 to support the magnet system. The yoke 150C has a wall extending along a first axis of a frame 140C to support the magnet system, and has no wall extending along a second axis of the frame 140C, where the second axis is longer than the first axis. As can be seen from a dash-line circular area 305, there is no long-axis pot wall for the yoke 150C in the frame 140C. As the yoke 150C has no wall extending along the long axis of the frame 140C, an additional side plate 353 is included in the transducer assembly 100 and inserted to the frame 140C to attach to a top surface of the side magnet 162.

In the example embodiments illustrated in FIGS. 1-3, both the voice coils 111A and 112A are attached to their respective diaphragms 131A and 132A, and are received in their respective magnetic gaps. The diaphragms 131A and 132A moves along with the movements of the voice coils 111A and 112A. As such, not only the undesired vibration force can be reduced, the movements of both the diaphragms 131A and 132A may achieve an effect of sound field superposition, increasing the output acoustic energy level of the transducer assembly 100. In some cases, the effect of sound field superposition may be abandoned but the effect of vibration reduction remains for the transducer assembly 100.

In some example embodiments, the voice coil 111A in the first transducer of the transducer assembly 100 may still operate to produce sound waves in response to the output audio signal applied thereto. The voice coil 112A may be provided to cancel the vibration force transferred by the voice coil 111A to the frame only, without providing sound radiation.

Figure 4A:
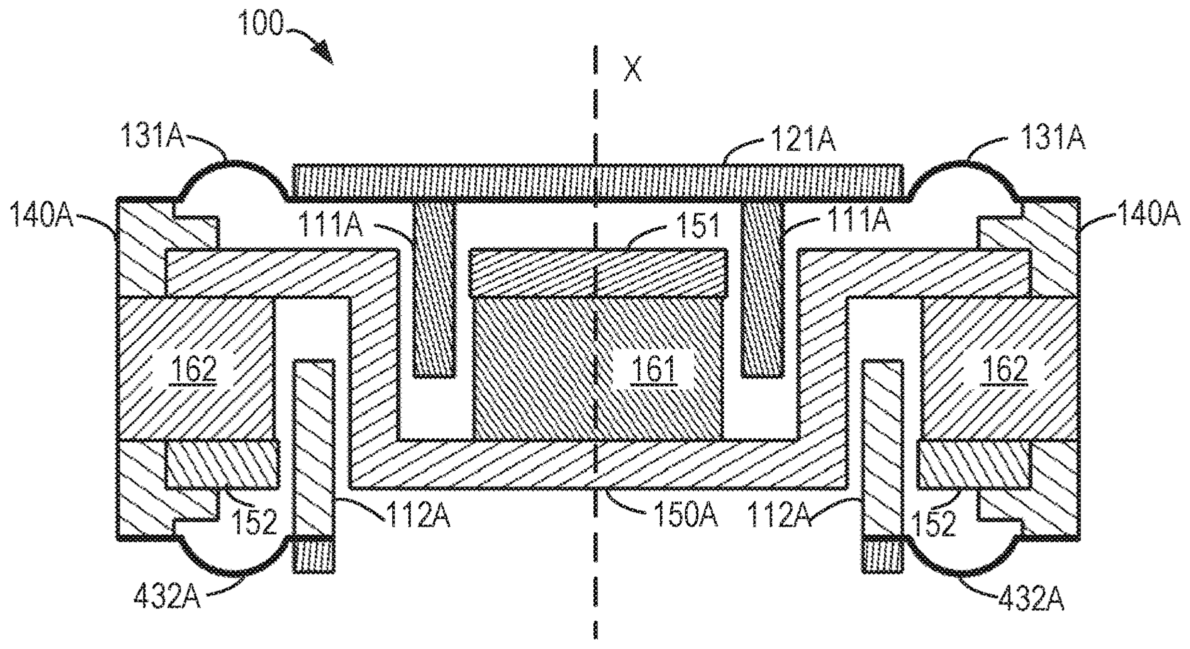
FIGS. 4A to 4C illustrate cross-sectional views of a transducer assembly in accordance with some further example embodiments disclosed herein.
Figure 4B:
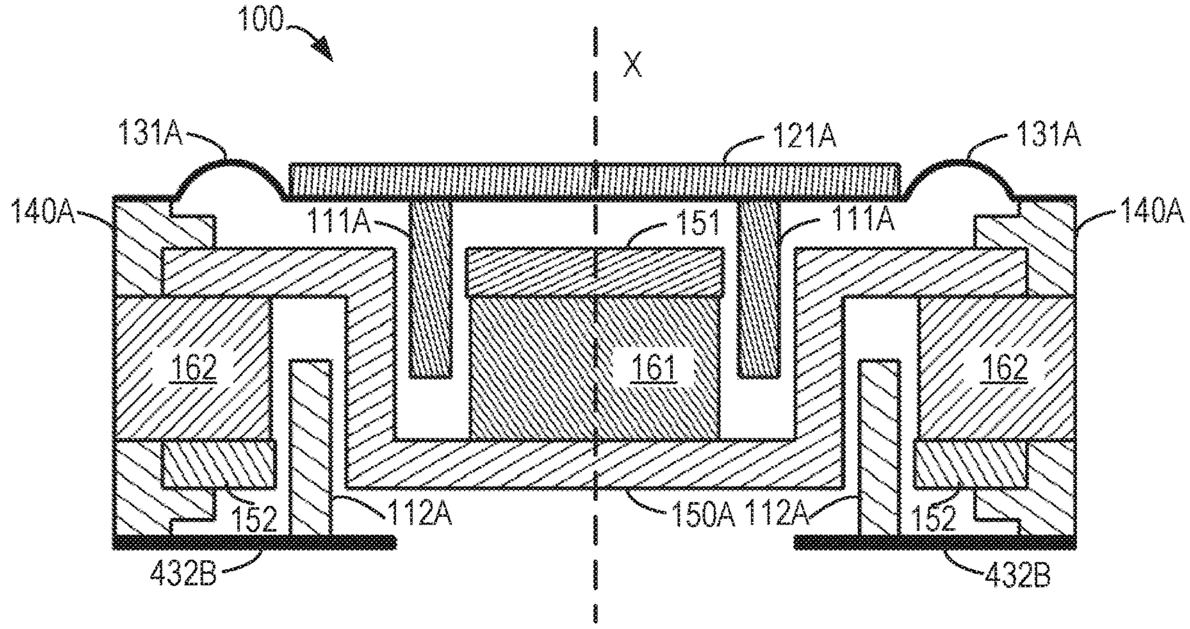
Figure 4C:
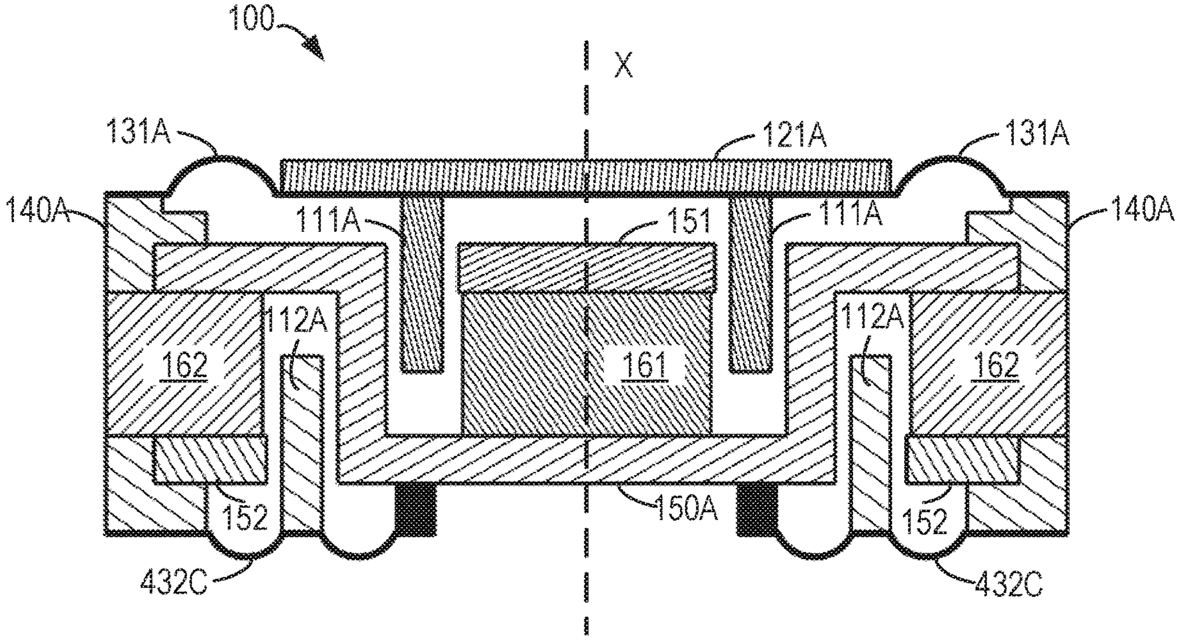

FIGS. 4A to 4C illustrate cross-sectional views of some variants for the transducer assembly 100 in which the effect of sound field superposition provided by the voice coil 112A is omitted. In these variants, the suspension system for the voice coil 112A may be designed to include a flexible suspension member to connect the voice coil 112A to the frame 140A, so as to transfer the inverse vibration force of the voice coil 112A to the frame 140A. Different from the diaphragm 132A, the suspension member may not cover the open end of the frame 140A and thus may not allow sound wave production by the vibration of the voice coil 112A. It would be appreciated that although the variants of the suspension system are illustrated with the same frame 140A and the yoke 150A as in FIG. 1, those variants may be similarly applied into the example embodiments as illustrated in FIGS. 2-3, and FIGS. 5A-5B and FIGS. 6A-6C which will be described below.

In the example of FIG. 4A, the voice coil 112A is attached to the frame 140A via a membrane suspension member 432A. The membrane suspension member 432A suspends at one edge from the frame 140A and connects to the voice coil 112A at the other edge. In the example of FIG. 4B, the voice coil 112A is attached to the frame 140A via a flexible printed circuit (FPC) broad 432B. The FPC broad 432B extends from the frame 140A to connect with the voice coil 112A.

In the example of FIG. 4C, a silicon rubber suspension member 432C is provided as a flexible suspension member to connect the voice coil 112A to the frame 140A. The silicon rubber suspension member 432C includes a silicon rubber sheet with one edge suspending from the frame and with another edge connected to the yoke 150A. The voice coil 112A is positioned on the sheet of silicon rubber.

It would be appreciated that other flexible suspension members than those shown in FIGS. 4A-4C may also be applicable in the transducer assembly 100 to connect the voice coil 112A to the frame 140A. In the example embodiments in any of FIGS. 4A-4C, to compensate for the weight difference between the voice coils 111A and 112A, an additional weight may be added to the suspension system for the voice coil 112A as it may be lighter than the suspension system for the voice coil 111A which includes the membrane plate 131A.

In some example embodiments, the two voice coils in the transducer assembly may have other size configurations than those illustrated in FIGS. 1-3 and 4A-4C. In some example embodiments, the magnet system of the transducer assembly 100 may also be varied to provide different magnetic gaps for receiving the two voice coils. FIGS. 5A-5B and FIGS. 6A-6C illustrates some examples of the transducer assembly 100 with variants of the magnet system.

In those examples illustrated in FIGS. 5A-5B and FIGS. 6A-6C, the transducer assembly 100 includes a voice coil 111B and a voice coil 112B, where the voice coil 112B is illustrated as having a smaller size (for example, a smaller diameter) than the voice coil 111B such that the voice coil 111B is outward to the voice coil 112B. A suspension system for the voice coil 111B includes the diaphragm plate 121B and the diaphragm 131B attached thereto, and the suspension system for the voice coil 112B includes the diaphragm plate 122B and the diaphragm 132B attached thereto. Due to the size configuration of the two voice coils, the diaphragm plate 122B and the diaphragm 132B each may have a smaller size than that of the diaphragm plate 121B and the diaphragm 131B.

Figure 5A:
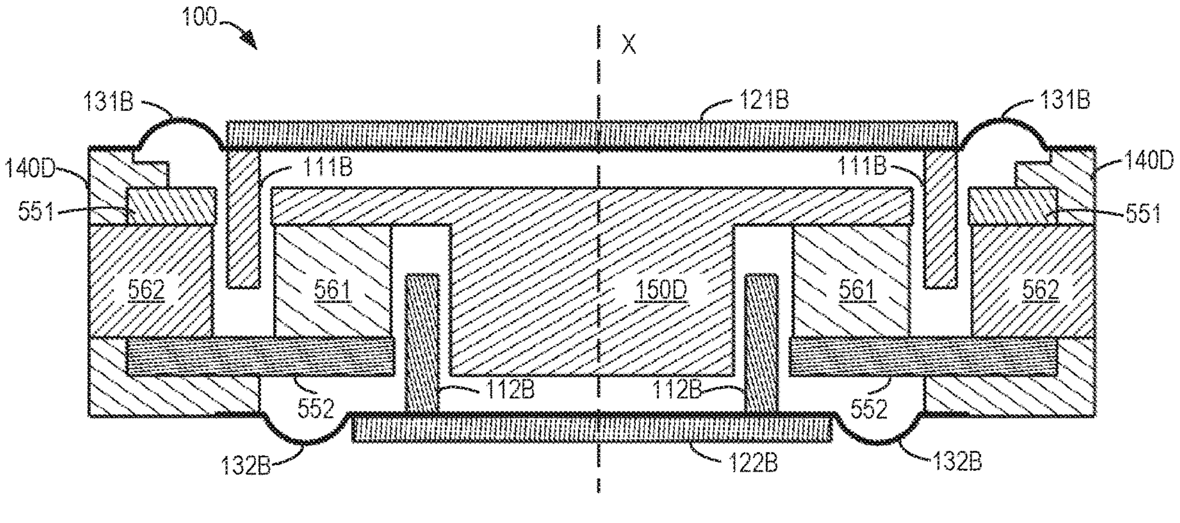
FIGS. 5A and 5B illustrate cross-sectional views of a transducer assembly in accordance with some further example embodiments disclosed herein.

In the example of FIG. 5A, the magnet system includes a center magnet 561 disposed in a middle part of the space defined by a frame 140D and a side magnet 562 symmetrically disposed at opposite sides of the center magnet 561 and having a distance from the center magnet 561. In the shown example, the side magnet 562 is partially embedded within a wall of the frame 140D. A yoke 150D of transducer assembly 100 has a protruding part disposed in the center of the space defined by the frame 140D. The center magnet 561 is disposed at opposite sides of the protruding part of the yoke 150D and has a distance from the protruding part. In some examples, the center magnet 561 may be disposed to enclose the protruding part of the yoke 150D.

In the example of FIG. 5A, a magnetic gap is formed between the center magnet 561 and the protruding part of the yoke 150D, for receiving the voice coil 112B. Another magnetic gap is formed between the center magnet 561 and the side magnet 562, for receiving the voice coil 111B. In some example embodiments, the yoke 150D may extend to attach to a surface of the center magnet 561. In some example embodiments, the magnet system may further include a side top plate 551 attached to a surface of the side magnet 562 and a further side top plate 552 attached to an opposite surface of the side magnet 562. The side top plate 522 may also extend to attach to a surface of the center magnet 561 which is opposite to the surface attached with the yoke 150D.

Figure 5B:
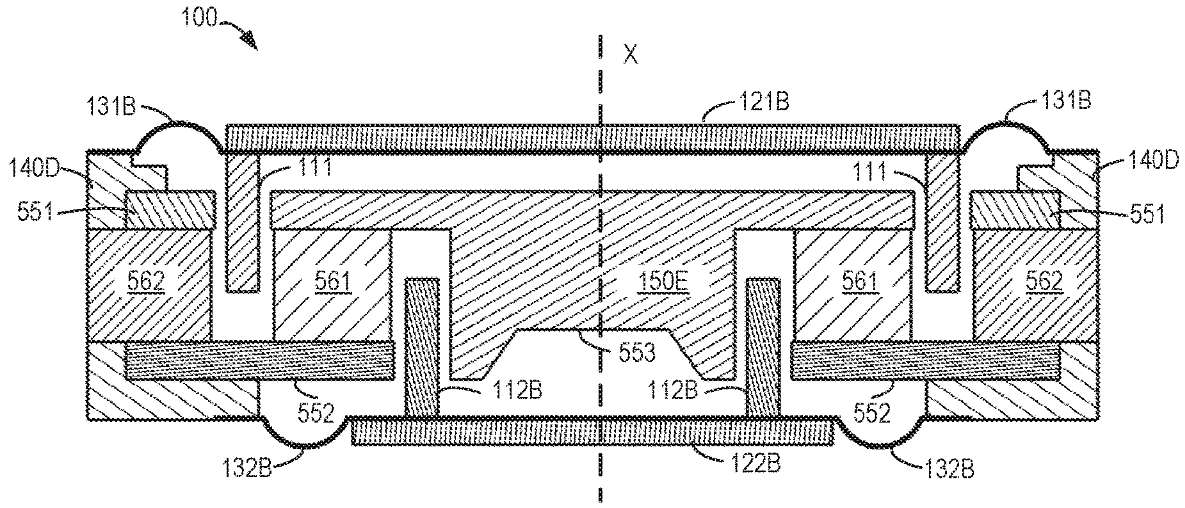

As compared with the example of FIG. 5A, a yoke 150E is included in the example of FIG. 5B, which is shaped to have a recess 553 in the surface of its protruding part to reduce harmonic distortion.

Figure 6A:
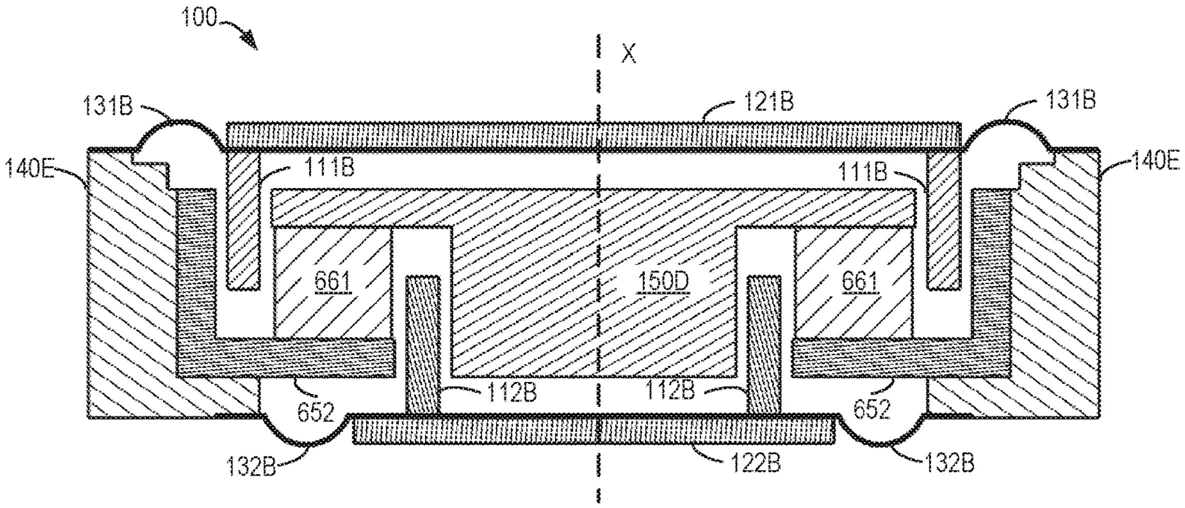
FIGS. 6A to 6C illustrate cross-sectional views of a transducer assembly in accordance with some further example embodiments disclosed herein.
Figure 6B:
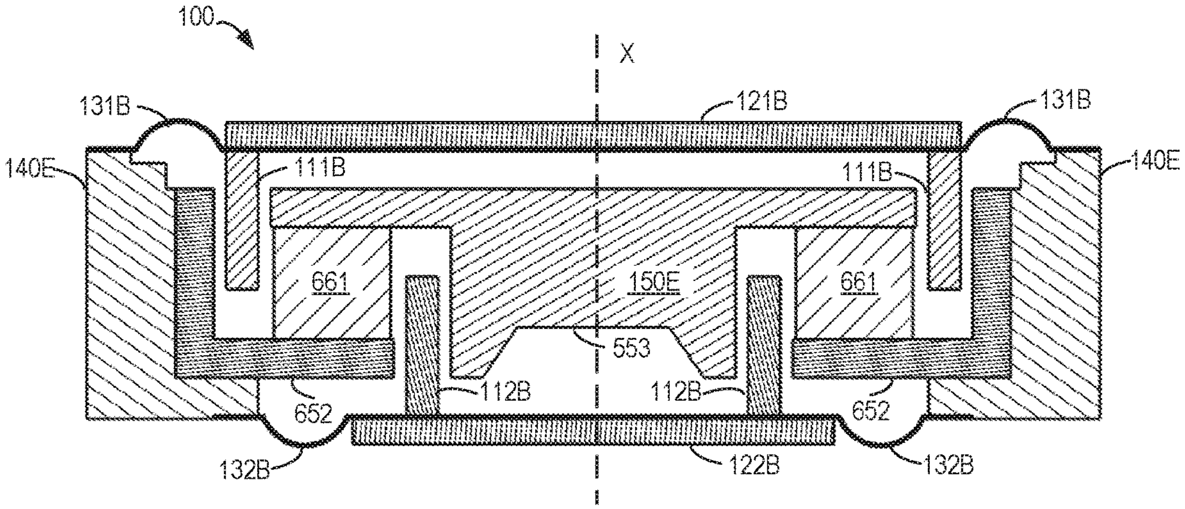
Figure 6C:
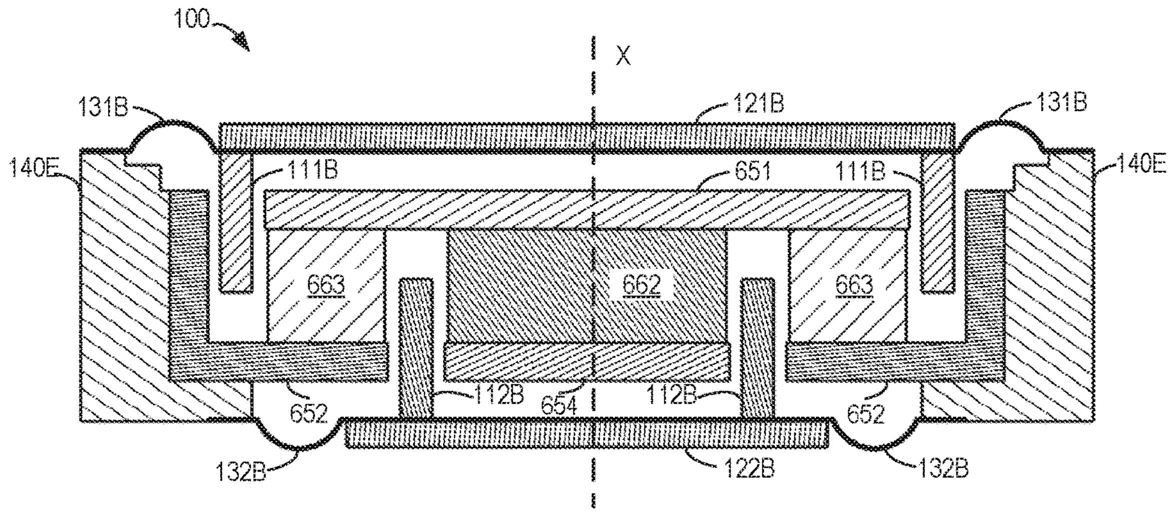

In some example embodiments, the magnet system of the transducer assembly 100 may not include a side magnet embedded within the frame. FIGS. 6A-6C illustrate some variants of the transducer assembly 100 according to such example embodiments.

As illustrated in FIG. 6A, the magnet system includes only one center magnet 661 provided in the middle part of a space defined by a frame 140E of the transducer assembly 100. The center magnet 661 may be disposed at opposite sides of a protruding part of the yoke 150D and has a distance from the protruding part of the yoke 150D. In some examples, the center magnet 661 may be disposed to enclose the protruding part of the yoke 150D. The protruding part of the yoke 150D is disposed in the center of the space defined by the frame 140E. In some example embodiments, the yoke 150D may extend to attach to a surface of the center magnet 661. The magnet system may further include an L-shaped side top plate 652. The L-shaped side top plate 652 has a wall to cover the inner wall surface of the frame 140E and another wall extending to attach to a surface of the center magnet 661 which is opposite to the surface attached with the yoke 150D.

In the example of FIG. 6A, a magnetic gap is formed between the center magnet 661 and the protruding part of the yoke 150D, for receiving the voice coil 112B. Another magnetic gap is formed between the center magnet 661 and the wall of the side top plate 652 attached to the frame 140E, for receiving the voice coil 111B.

In the example of FIG. 6B, as compared with the example of FIG. 6A, the magnet system of the transducer assembly 100 is the same but the same yoke 150E with the recess 553 as in the example of FIG. 5B is included to reduce harmonic distortion.

FIG. 6C illustrates that the magnet system of the transducer assembly 100 includes A center magnet 662 and a side magnet 663. Unlike the side magnets in FIGS. 1-3, 4A-4C, and 5A-5B, the side magnet 663 is not embedded within the wall of the frame 140E but is disposed within the space defined by the frame 140E. The side magnet 663 may be provided symmetrically at two opposite sides of the center magnet 662 and has distances from both the center magnet 662 and the wall of the frame 140E. In the example of FIG. 6C, a top plate 651 also has a flat wall attached to both a surface of the center magnet 662 and a surface of the side magnet 663. The L-shaped side top plate 652 of the magnet system may have a wall to cover the inner wall surface of the frame 140E and another wall extending to attach to a surface of the side magnet 663. The magnet system may further include a bottom plate 654 attached to a surface of the center magnet 662 which is opposite to the surface attached with the top plate 651.

In practical applications, a transducer assembly may be mounted into a chamber to form a speaker system for an electronic device (e.g., a laptop computer, a phone, a television, etc.). The undesired vibration observed for the speaker system may depend on various parameters related to the rigid body to which the transducer assembly is mounted. For example, the transducer assembly may be embedded into a speaker box. The vibration may depend on various parameters related to the speaker box, including the mass of the speaker box, the mechanical parameters (e.g., Cms, Kms, and Rms) of grommets used to mount the transducer assembly, and so on.

Figure 6D:
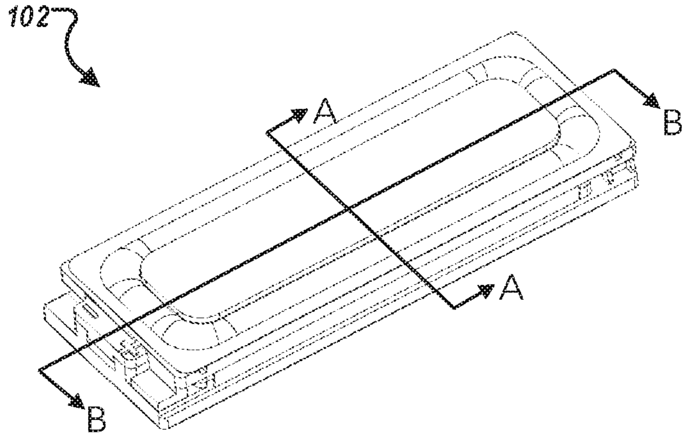
FIG. 6D illustrates an example transducer assembly.

FIG. 6D illustrates an example transducer assembly 102. The transducer assembly 102 may be the same as the transducer assembly 100 according to any one of the embodiments described above, and may implement every feature, sub-feature, component and subcomponent of the transducer assembly 100 according to such an embodiment. The difference between the transducer assembly 100 and transducer assembly 102 is the arrangement of voice coils and diaphragm plates. The transducer assembly 102 implements an asymmetric force balance transducer design. In order to lower down the vibration force, it has a diaphragm and a diaphragm plate on each of the two sides of transducer, wherein the diaphragm plate and coil part design are all the same, but asymmetrical, for both sides. In the transducer assembly 102, top and bottom diaphragm plates face opposite directions and have a same size. The voice coils are positioned to face opposite directions but are offset lengthwise, to reduce total thickness of the transducer assembly 102. With this new design, the space of support materials for magnet system could be saved and reused to decrease the total thickness. The positions of two diaphragm are not totally symmetric, they have deviations on length direction. This design can make it easy for vibration balancing, and it can save the height of transducer at the same time.

Additional details of the transducer assembly 102 in widthwise direction A and lengthwise direction B are shown below in FIGS. 6E and 6F, respectively. In the example shown, length of the transducer assembly 102 is greater than width. In various implementations, length can be equal to, or smaller than, width of the transducer assembly 102.

Figure 6E:
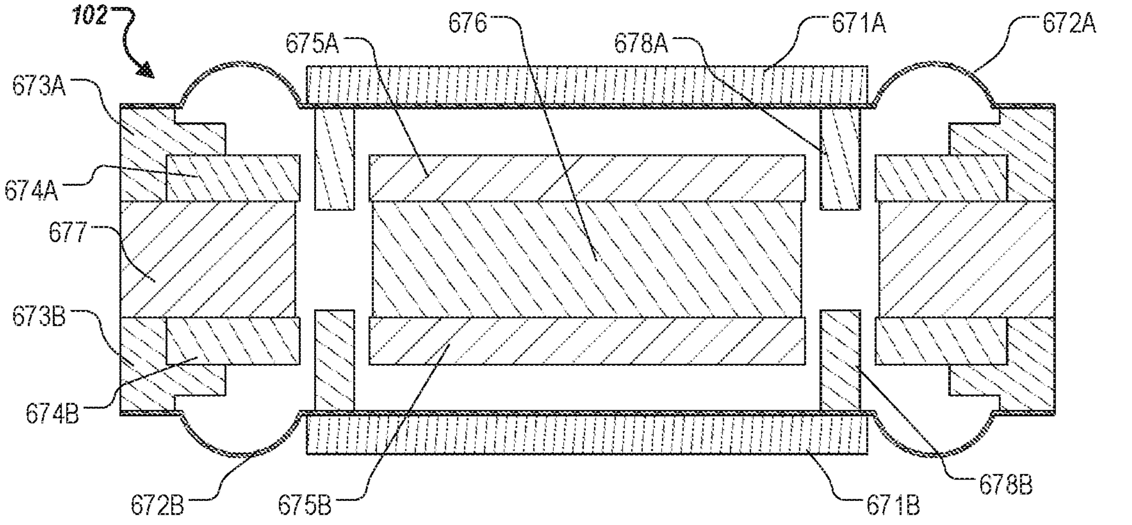
FIG. 6E illustrates a first cross-sectional view of the example transducer assembly of FIG. 6D.

FIG. 6E illustrates a first cross-sectional view of the example transducer assembly 102 of FIG. 6D. This view corresponds to the width-wise direction A of FIG. 6D. As shown, the transducer assembly 102 includes a first voice coil 678A, a second voice coil 678B, a first diaphragm plate 671A, a second diaphragm plate 671B, a first diaphragm 672A, a second diaphragm 672B, a first frame (also known as basket) 673A, and a second frame 673B. The frames 673A and 673B define a space therein to accommodate other components of the transducer assembly 102.

Two suspension systems are provided to connect the voice coils 678A and 678B to the respective frames 673A and 673B. In the example embodiments shown, the suspension system for the voice coil 678A includes the diaphragm plate 671A and the diaphragm 672A attached thereto, and the suspension system for the voice coil 678B includes the diaphragm plate 671B and the diaphragm 672B attached thereto. The diaphragm plates 671A and 671B may be arranged in parallel and have the same or different sizes. In general, diaphragm plate 671A corresponds to diaphragm plates 121A and 121B as described above; diaphragm plate 671B corresponds to diaphragm plates 122A and 122B as described above; diaphragm 672A corresponds to diaphragms 131A and 131B as described above; voice coil 678A corresponds to voice coils 111A and 111B; voice coil 678B corresponds to voice coils 112A and 112B; frame 673A and 673B correspond to frames 140A-140E, wherein "corresponding" means that they may share the same features and functions. Likewise, the transducer assembly 102 includes a center magnet 676, one or more side magnets 677, one or more top plates 675A, one or more bottom plates 675B, one or more top side plates 674A, and one or more bottom side plates 674B.

Figure 6F:
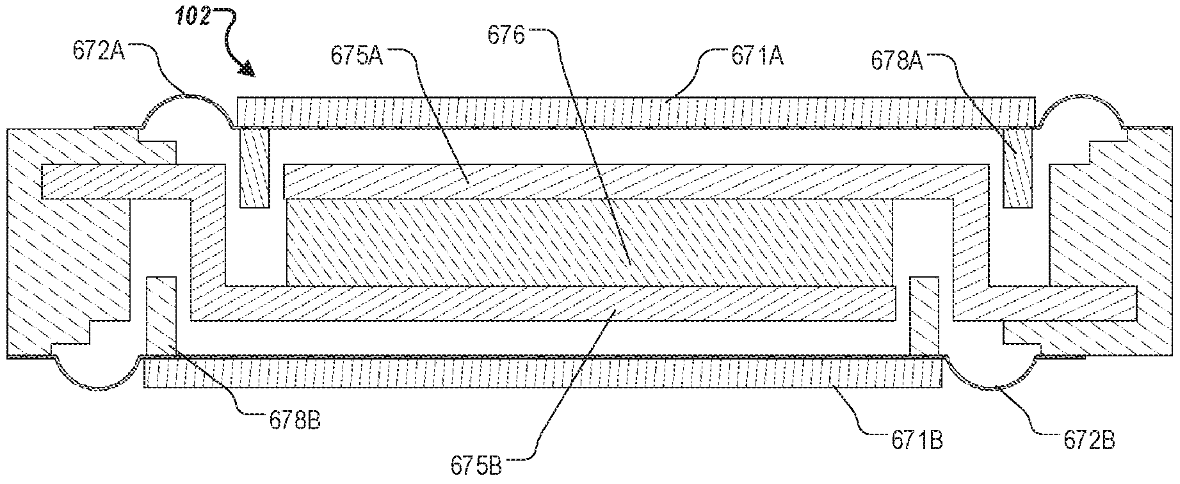
FIG. 6F illustrates a second cross-sectional view of the example transducer assembly of FIG. 6D.

FIG. 6F illustrates a second, lengthwise cross-sectional view of the example transducer assembly 102 of FIG. 6D. As can be seen, diaphragm plates 671A and 671B have the same length, are positioned in parallel and facing opposite directions. The diaphragm plates 671A and 671B are placed in offset position, thus allowing voice coils 678A and 678B to face each other but not directly. This arrangement allows voice coils 678A and 678B to have longer travel than when they directly face each other, thus reducing the total height of the transducer assembly 102. In the example shown, the diaphragm plates 671A and 671B, as well as the diaphragms 672A and 672B, follow the outlines of the voice coils 678A and 678B, respectively. The positions of the diaphragm plates 671A and 671B are asymmetric for top and bottom on length direction. The effective areas of the diaphragm plates 671A and 671B are smaller than some other implementations described below.

Figure 6G:
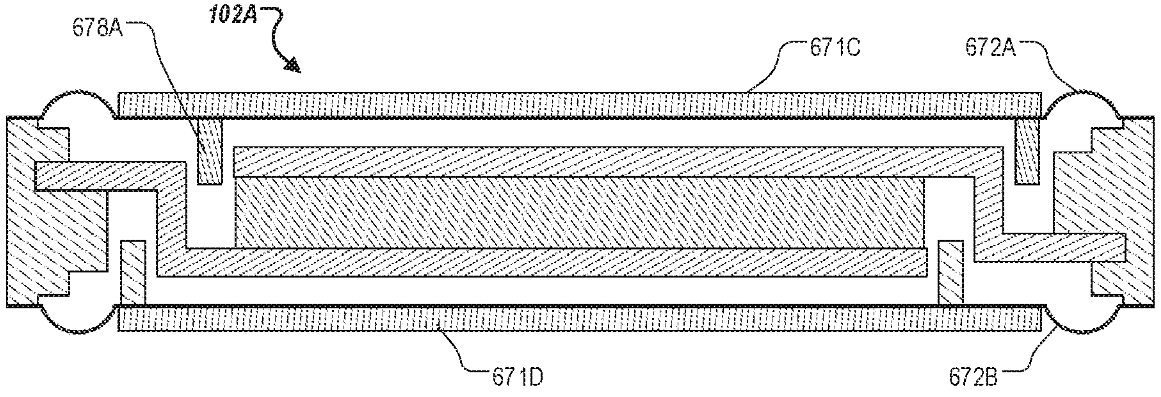
FIGS. 6G-6K illustrate various example implementations of the example transducer assembly of FIG. 6D.

FIGS. 6G-6K illustrate various example implementations of the example transducer assembly 102 of FIG. 6D. The views in FIGS. 6G-6K are lengthwise views. In FIG. 6G, the implementation is designated as transducer assembly 102A. The diaphragm plates 671C and 671D each has one end extending beyond one side of the voice coils 678A and 678B, respectively. Thus, although the voice coils 678A and 678B are positioned asymmetrically lengthwise, the diaphragm plates 671C and 671D are symmetric in terms of effective area. This design will allow the diaphragm plates 671C and 671D, corresponding to the diaphragm plates 671A and 671B described above, to have larger effective vibration areas.

Figure 6H:
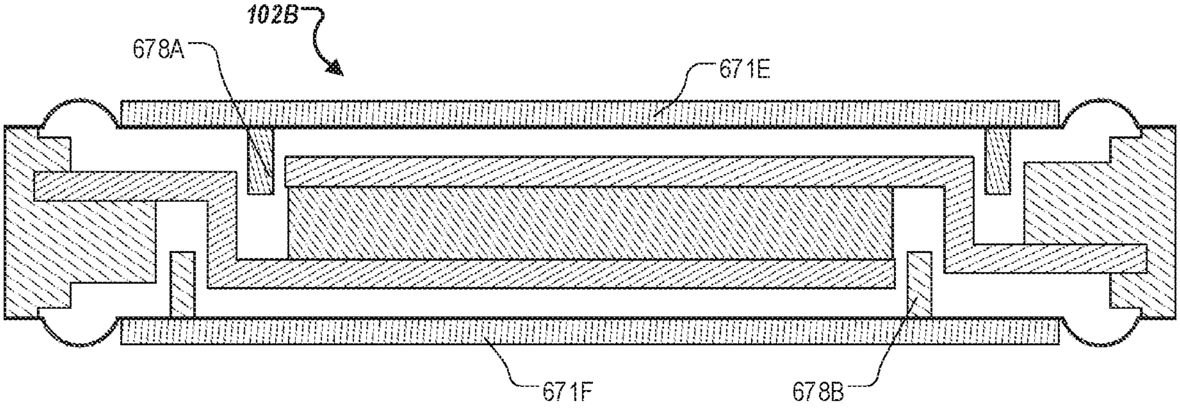

In FIG. 6H, the implementation is designated as transducer assembly 102B. The diaphragm plates 671E and 671F each has both ends extending beyond the voice coils 678A and 678B, respectively. Thus, although the voice coils 678A and 678B are positioned asymmetrically lengthwise, the diaphragm plates 671C and 671D are symmetric in terms of effective area. This design will allow the diaphragm plates 671E and 671F, corresponding to the diaphragm plates 671A and 671B described above, to have even larger effective vibration areas than those of diaphragm plates 671C and 671D.

Figure 6I:
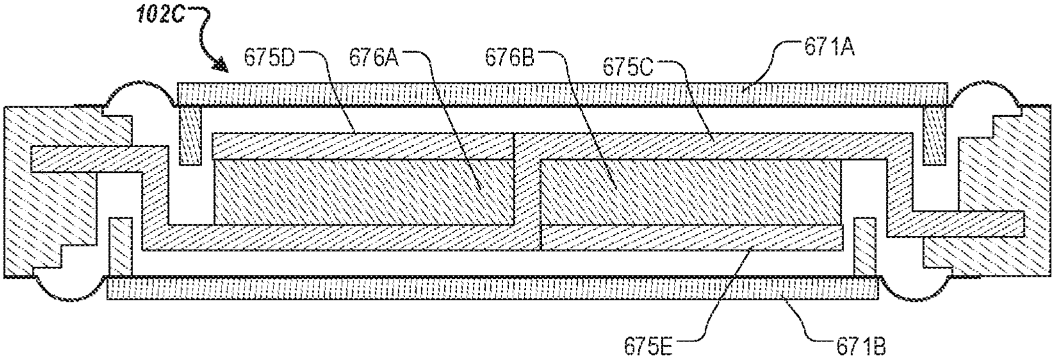

In FIG. 6I, the implementation is designated as transducer assembly 102C. In this implementation, the center magnet 676 is separated into two parts, a first center magnet 676A and a second center magnet 676B. The one or more top plates 675A and one or more bottom plates 675B are arranged in a way that a particular plate 675C has an S shape and goes from bottom to top. This particular plate 675C covers a bottom portion of the first center magnet 676A and a top portion of the second center magnet 676B. A top plate 675D covers the top portion of the first center magnet 676A. A bottom plate 675E covers the bottom portion of the second center magnet 676B. The center magnets 676A and 676B, as well as plates 675D and 675E, are fixed on one plate 675C. The strength of them is not limited by strength of glue.

Figure 6J:
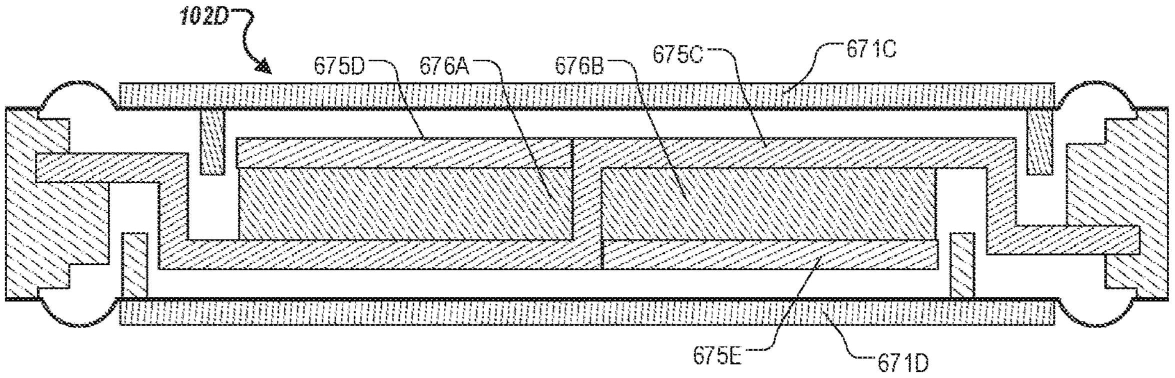

In FIG. 6J, the implementation is designated as transducer assembly 102D. The diaphragm plates 671C and 671D each has one end extending beyond the voice coils 678A and 678B, respectively. Thus, although the voice coils 678A and 678B are positioned asymmetrically lengthwise, the diaphragm plates 671C and 671D are symmetric in terms of effective area. The center magnets 676A and 676B, plates 675C, 675D and 675E are implemented the same way as described in reference to FIG. 6I.

Figure 6K:
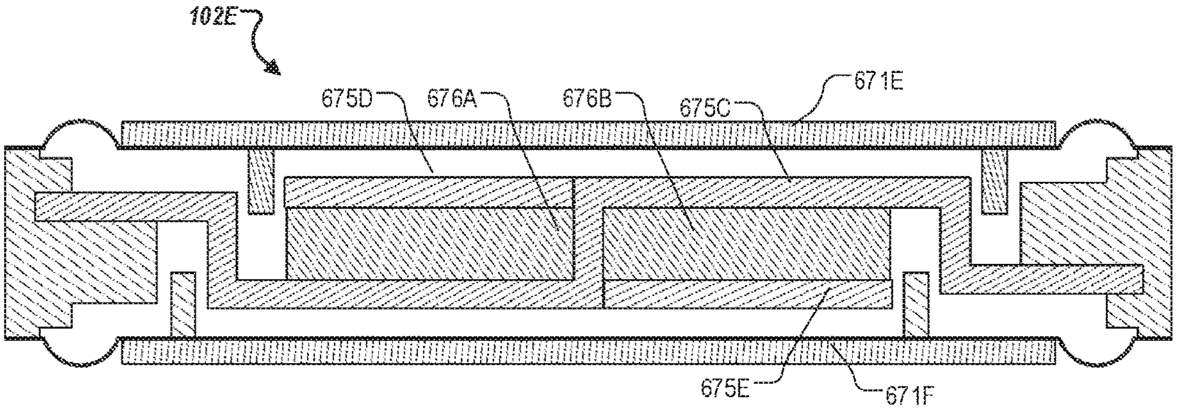
Figure 6L:
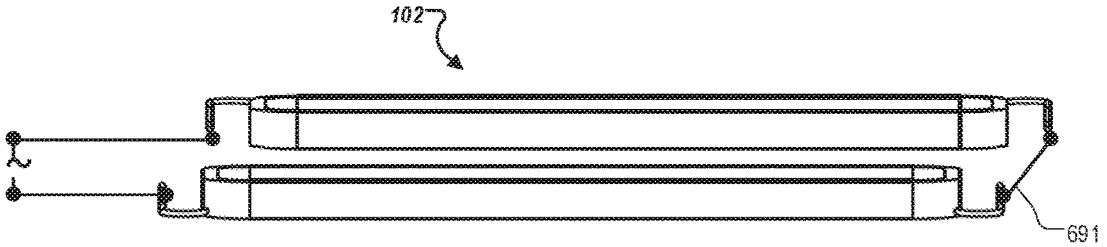
FIGS. 6L-6N illustrate various example wirings of the example transducer assembly of FIGS. 6D-6K.

In FIG. 6K, the implementation is designated as transducer assembly 102E. The diaphragm plates 671E and 671F each has both ends extending beyond the voice coils 678A and 678B, respectively. Thus, although the voice coils 678A and 678B are positioned asymmetrically lengthwise, the diaphragm plates 671C and 671D are symmetric in terms of effective area. The center magnets 676A and 676B, plates 675C, 675D and 675E are implemented the same way as described in reference to FIG. 6I FIGS. 6L-6N illustrate various example wirings of the example transducer assembly of FIGS. 6D-6K. The two sides of diaphragm plates of a transducer assembly 102, including variations 102A through 102E, have the same size and acoustic characteristics. Accordingly, they can be connected in series, in parallel or in separated channels. Different connecting methods can lead to different structure design and different power application. FIG. 6L illustrates an example transducer assembly 102, which can be in variations of 102A through 102E, connected to a single channel. The connection between a top portion of the transducer assembly 102 and a bottom portion of the transducer assembly 102 is a serial connection 691.

Figure 6M:
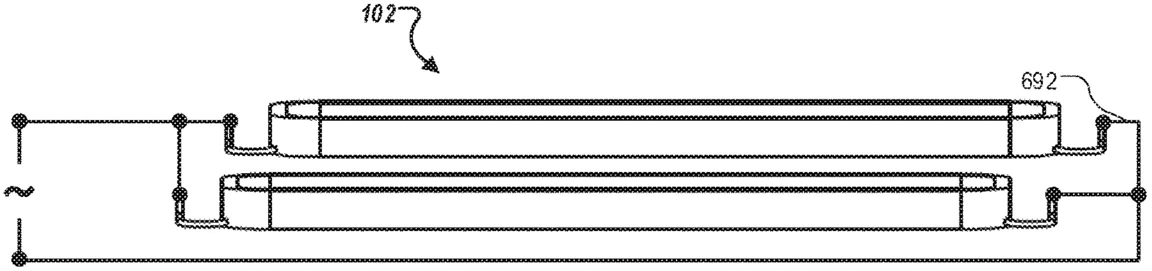

FIG. 6M illustrates an example transducer assembly 102, which can be in variations of 102A through 102E, connected to a single channel. The connection between a top portion of the transducer assembly 102 and a bottom portion of the transducer assembly 102 is a parallel connection 692.

Figure 6N:
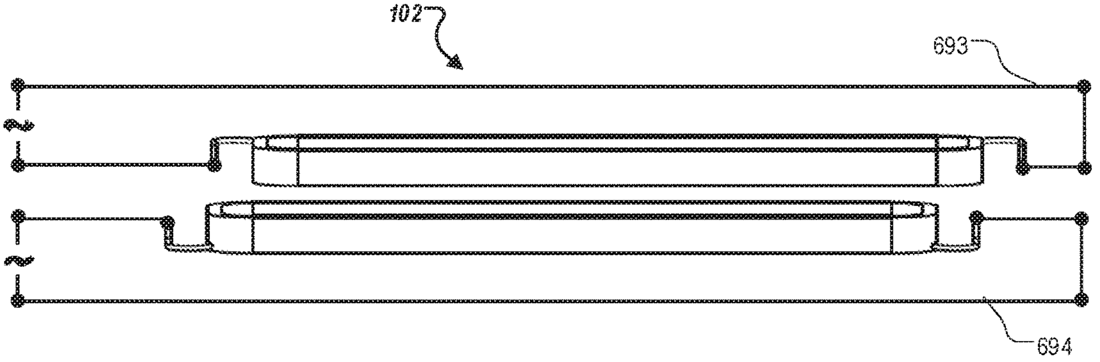

FIG. 6N illustrates an example transducer assembly 102, which can be in variations of 102A through 102E, connected to two channels. The top portion of the transducer assembly 102 is connected to a first channel through connection 693. The bottom portion of the transducer assembly 102 is connected to a second channel through connection 694.

Figure 7A:
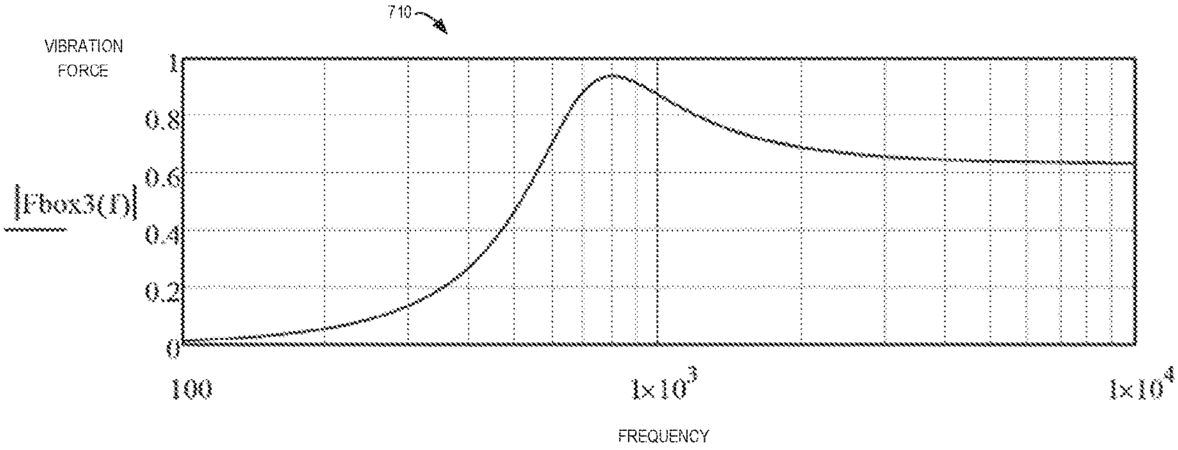
FIG. 7A illustrates a curve graph of the vibration force over a frequency range measured on a speaker box embedded with a traditional transducer assembly.
Figure 7B:
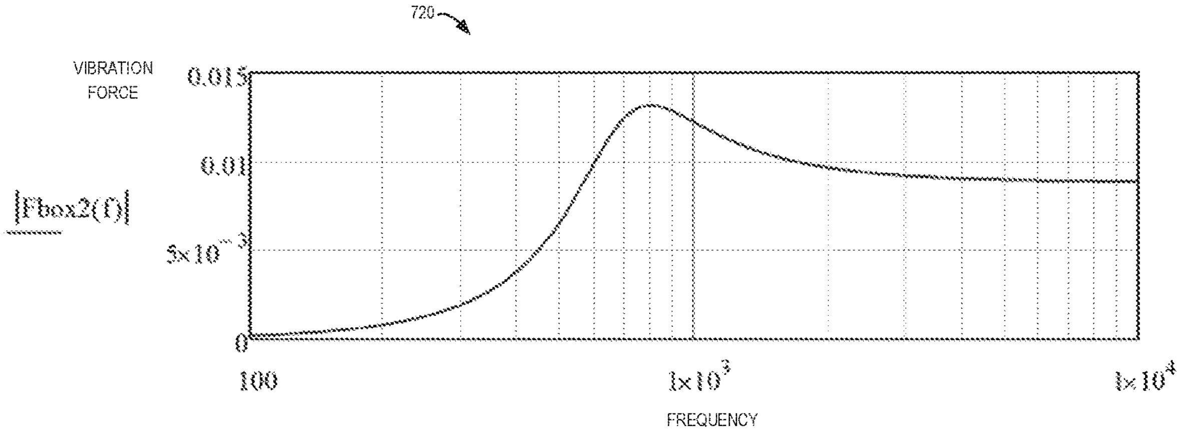
FIG. 7B illustrates a curve graph of the vibration force over a frequency range measured on a speaker box embedded with a transducer assembly having dual unequal-sized voice coils.

FIG. 7A illustrates a curve graph 710 of a vibration force over a frequency range measured on a speaker box embedded with a traditional transducer assembly, and FIG. 7B illustrates a curve graph 720 of a vibration force over a frequency range measured on a speaker box embedded with a transducer assembly having dual voice coils. It is assumed that the parameters the parameters related to the speaker box are the same. The transducer assembly measured in the example of FIG. 7B have the same dual voice coil configuration as the transducer assembly 100 according to some embodiments disclosed herein but a same audio signal is applied to the two voice coils.

Figure 7C:
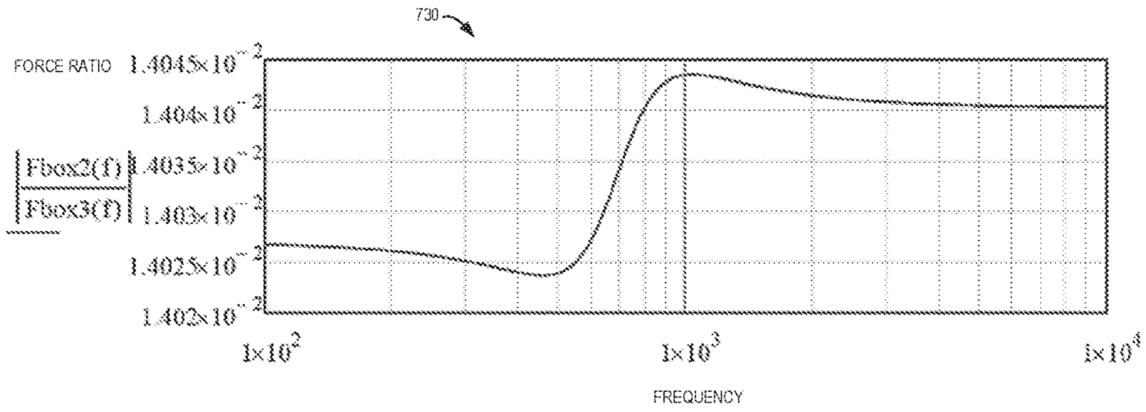
FIG. 7C illustrates a curve graph of force ratio between the vibration force in FIG. 7A and the vibration force in FIG. 7B.

FIG. 7C illustrates a curve graph 730 of force ratio by dividing the vibration force in the example of FIG. 7B by the vibration force in the example of FIG. 7A. By comparing the vibration forces in each frequency band and the force ratio, it can be seen that the transducer assembly disclosed in the example embodiments herein can reduce most of the vibration force transferred to the frame. A small residual vibration force may be observed on the speaker box embedded with the transducer assembly due to the asymmetric design of the two voice coils. As mentioned above, the residual vibration force can be compensated for by means of signal processing on an input audio signal.

In some example embodiments, to further reduce or minimize the undesired residual vibration force, in some example embodiments disclosed herein, instead of applying a same (amplified) audio signal to both the voice coils, an input audio signal is processed to generate two output audio signals with different energy levels for the voice coils 111A/B and 112A/B, respectively. The output audio signals can be applied to excite the voice coils 111A/B and 112A/B, independently, to control the movement velocities and amplitudes of the voice coils 111A/B and 112A/B and thus balance the vibration force transferred to the frame with a higher precision level.

In some example embodiments, the input audio signal for the transducer assembly 100 may be a single-channel audio signal. In some example embodiments, by processing the input audio signal, the output audio signals provided for the voice coils 111A/B and 112A/B may be generated to have the same phase but different energy levels in each frequency band. That is, the two output audio signals may have different spectral energy distributions across the whole frequency range. The processing of the input audio signal may be performed in a signal processing system and the resultant output audio signals are applied to the voice coils 111A/B and 112A/B of the transducer assembly 100.

In some practical applications, in addition to the different rigid bodies, a transducer assembly may be mounted in different manners into a device, e.g., an electronic device, to implement as a speaker system or a part of the speaker system of the device. FIGS. 8A to 8D illustrate cross-sectional views of example devices with the transducer assembly 100 embedded therein in accordance with some further example embodiments disclosed herein. Each of FIGS. 8A to 8D illustrates a short-axis cross-sectional view (the left-hand view) and a long-axis cross-sectional view (the right-hand view) of the corresponding device.

Figure 8A:
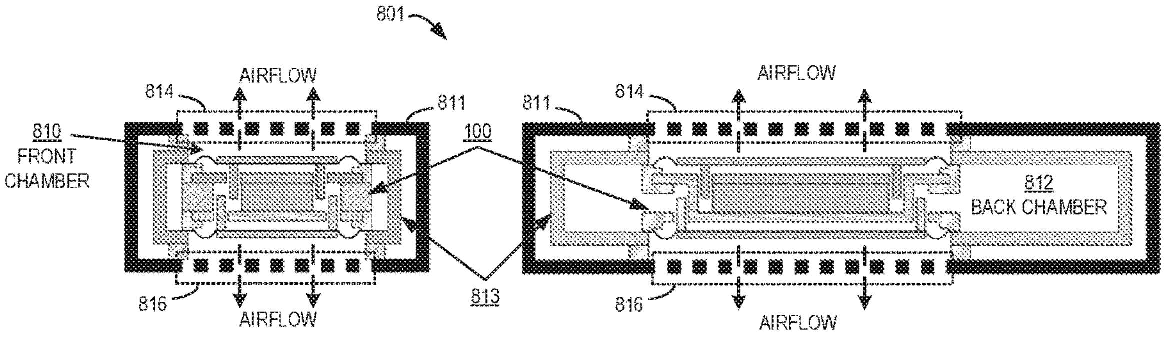
FIGS. 8A to 8D illustrate cross-sectional views of example devices with the transducer assembly embedded therein in accordance with some further example embodiments disclosed herein.

In the example of FIG. 8A, the transducer assembly 100 is embedded into a device 801, located within a device box 811 of the device 801. The transducer assembly 100 is enclosed by a speaker box 813 which is disposed within the device box 811. The speaker box 813 extends along the long axis of the device box 811 to form a back chamber 812. The device box 811 has a first plurality of outlets 814 on its upper wall and a second plurality of outlets 816 on its bottom wall, to allow for passage of airflow from a front chamber 810. Thus, sounds can be projected from both the upper and bottom walls of the device box 811.

Figure 8B:
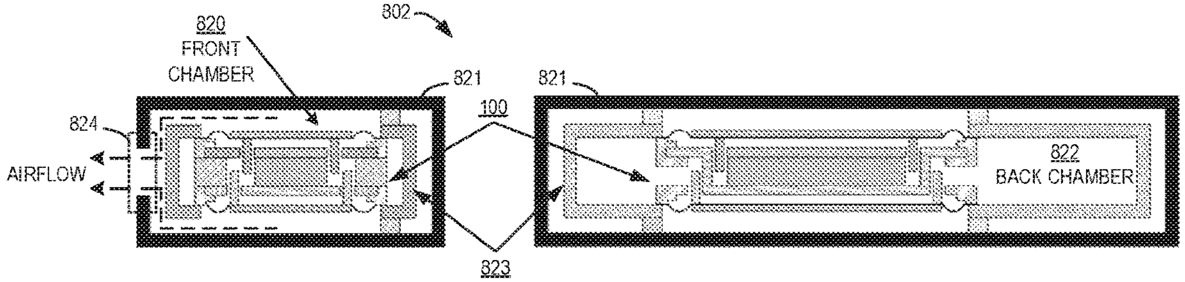

In the example of FIG. 8B, the transducer assembly 100 is embedded into a device 802, located within a device box 821 of the device 802. The transducer assembly 100 is enclosed by a speaker box 823 which is disposed within the device box 821. The speaker box 823 extends along the long axis of the device box 821 to form a back chamber 822. An outlet 824 is formed on the left wall of the device box 821, to allow for passage of airflow from a front chamber 820. Thus, sounds can be projected from the left wall of the device box 821.

Figure 8C:
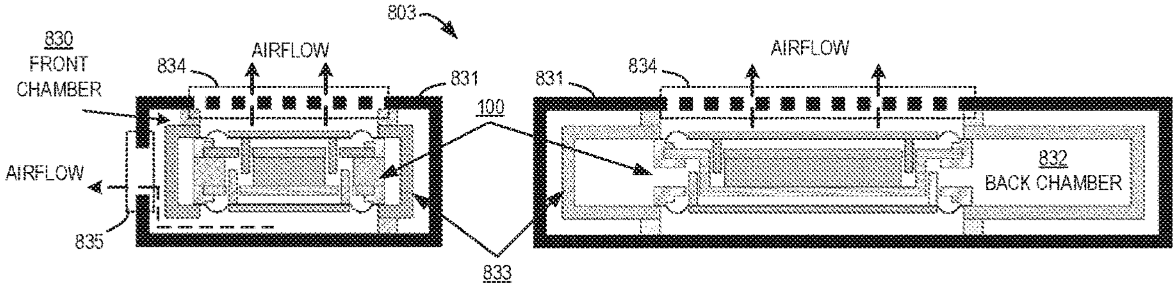

In the example of FIG. 8C, the transducer assembly 100 is embedded into a device 803, located within a device box 831 of the device 803. The transducer assembly 100 is enclosed by a speaker box 833 which is disposed within the device box 831. The speaker box 833 extends along the long axis of the device box 831 to form a back chamber 832. The device box 831 has a plurality of outlets 834 on its upper wall and an outlet 835 on the left wall of the device box 831, to allow for passage of airflow through those outlets from a front chamber 830. Thus, sounds can be projected from both the upper wall and the left wall of the device box 831.

Figure 8D:
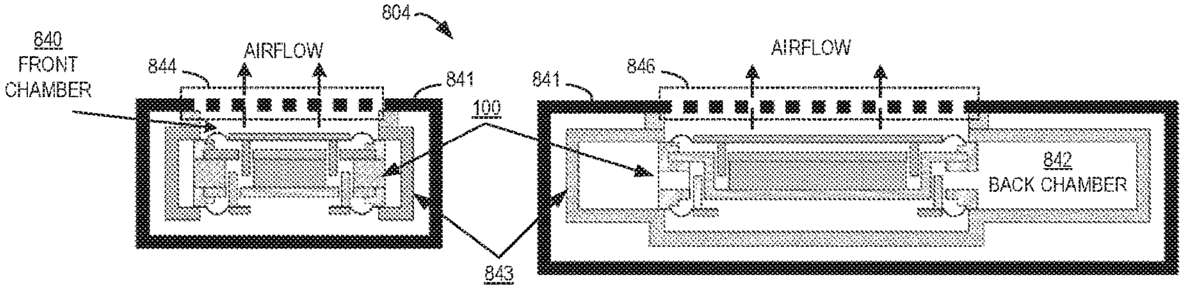

In the example of FIG. 8D, the transducer assembly 100 is embedded into a device 803, located within a device box 841 of the device 804. The transducer assembly 100 is enclosed by a speaker box 843 which is disposed within the device box 841. The speaker box 843 extends along the long axis of the device box 841 to form a back chamber 842. The device box 841 has a plurality of outlets 844 on its upper wall, to allow for passage of airflow through those outlets from a front chamber 830. Thus, sounds can be projected from the upper wall of the device box 841.

Due to the different applications, the spaces and sound outlets will be different, resulting in non-flat responses as a function of frequency. In such a case, it may be desirable to flatten the frequency response and improve the sound quality. Thus, in some example embodiments, in addition to processing the input audio signal for the purpose of vibration cancellation, the frequency response for the speaker system may be tuned to be flat by means of signal processing.

Figure 9:
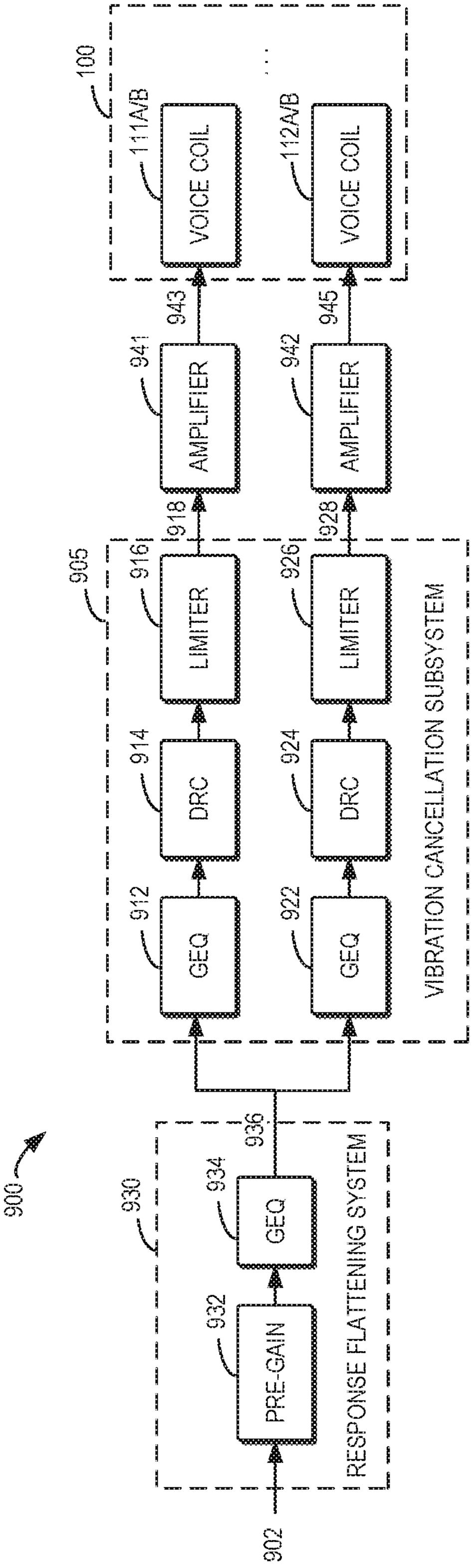
FIG. 9 illustrates a block diagram of a signal processing system in accordance with some example embodiments disclosed herein.

FIG. 9 illustrates a block diagram of a signal processing system 900 in accordance with some example embodiments disclosed herein. The signal processing system 900 is configured to generate respective output audio signals for the two voice coils in response to an input audio signal for the transducer assembly 100. In some example embodiments, the transducer assembly 100 is configured for output of single-channel audio. The input audio signal may thus include a single-channel audio signal to be output by the transducer assembly 100. In a speaker system configured for output of multi-channel audio, a plurality of transducer assemblies similar to the transducer assembly 100 may be included with each configured for output a single-channel audio signal of the multi-channel audio. The signal processing system 900 is configured to perform single-channel tuning for the speaker system. As illustrated, the signal processing system 900 comprises a vibration cancellation subsystem 905 and a response flattening subsystem 930.

An input audio signal 902 to be output by the transducer assembly 100 is received for signal processing. In the example of FIG. 9, the input audio signal 902 is first passed to the response flattening system 932. The response flattening system 932 is configured to perform gain adjustment on the input audio signal 902 based on a set of predetermined parameter values (sometimes referred to as a "third set of parameter values"), to generate an intermediate audio signal 936. The purpose of the gain adjustments in the response flattening system 932 is to flatten the frequency response for a speaker system into which the transducer assembly 100 is embedded.

In some example embodiments, as illustrated, the response flattening subsystem 930 comprises a pre-gain unit 932 and a graphic equalization (GEQ) unit 934. The pre-gain unit 932 is configured to apply pre-gain adjustments on the input audio signal 902 based on corresponding parameter values in the third set. The GEQ unit 934 is configured to adjust frequency-amplitude characteristics of the processed input audio signal from the pre-gain unit 932 based on corresponding parameter values in the third set and generate the intermediate audio signal 936 for the following vibration cancellation subsystem 905. The GEQ unit 934 may apply different gains to different frequency bands of the processed input audio signal.

The vibration cancellation subsystem 905 comprises two independent signal paths for processing on an audio signal in parallel, to generate respective output audio signals for the voice coils 111A/B and 112A/B of the transducer assembly 100. For the purpose of brevity, only the voice coils 111A/B and 112A/B are illustrated in FIG. 9 and other components of the transducer assembly 100 are omitted. To further reduce or minimize the residual vibration force on the frame of the transducer assembly 100, the input audio signal 902 (more specifically, the intermediate audio signal 936) is processed in the two signal paths, to generate two output audio signals 918 and 928 having different energy levels. For example, the output audio signals 918 and 928 may have different spectral energy distributions across the whole frequency range of the input audio signal 902.

The different energy levels and the different sizes of the voice coils 111A/B and 112A/B may cause substantially the same vibrations transferred from the voice coils 111A/B and 112A/B to the frame, resulting in vibration cancellation on the frame due to the opposite movements of the voice coils. In some example embodiments, if the voice coil 111A/B is operable to vibrate in a larger magnitude of vibration than the voice coil 112A/B in response to a same audio signal, then the output audio signal to applied by the signal processing system 900 to the voice coil 111A/B may be generated to have a lower energy level than the output audio signal to be applied to the voice coil 112A/B. Otherwise, if the voice coil 111A/B is operable to vibrate in a smaller magnitude of vibration than the voice coil 112A/B in response to a same audio signal, the output audio signal to be applied to the voice coil 111A/B may be generated to have a larger energy level than the output audio signal to be applied to the voice coil 112A/B.

In some example embodiments, the input audio signal 902 (or more specifically, the intermediate audio signal 936) may be subject to respective gain adjustments based on two different sets of parameter values in the two signal paths. That is, the same type of signal processing is performed in the two signal paths but different parameter values are applied. In the illustrated example embodiments in FIG. 2, a first one of the two signal paths comprises a GEQ unit 912, a dynamic range control (DRC) unit 914, and a limiter 916 to generate the output audio signal 918, and a second one of the two signal paths comprises a GEQ unit 922, DRC unit 924, and a limiter 926 to generate the output audio signal 928.

The GEQ unit 912 and the GEQ unit 922 are each configured to further adjust frequency-amplitude characteristics of its input audio signal (the intermediate audio signal 936 in the example of FIG. 9) based on corresponding parameter values in the first and the second sets, to apply different gains to different frequency bands of the audio signal. The DRC unit 914 and the DRC unit 924 are each configured to apply dynamic range control to its input audio signal based on corresponding parameter values in the first and the second sets. DRC refers to time-dependent audio processing operations that alter (e.g., compress, cut, expand, boost, etc.) an input dynamic range of loudness levels in its input audio signal into an output dynamic range that is different from the input dynamic range. The limiter 916 and the limiter 926 are each configured to perform gain limiting on its input audio signal by adjusting the signal amplitude based on corresponding parameter values in the first and the second sets. The GEQ unit, DRC unit, and the limiter in each signal path sequentially operate to process the output from its upstream unit.

In some example embodiments, the signal processing system 900 may further include amplifiers 941 and 942 for the first and the second signal paths in the vibration cancellation subsystem 905, respectively. The amplifiers 941 and 942 are configured to amplify the output audio signals 918 and 928, respectively, to generate the amplified output audio signals 943 and 945. The amplified output audio signals 943 and 945 are then applied to the voice coils 111A/B and 112A/B, respectively.

In some example embodiments, the first and the second sets of parameter values applied in the two signal paths of the vibration cancellation subsystem 905 may be determined after the transducer assembly 100 has been mounted into a chamber of the speaker system. One or more test input audio signals may be input to the signal processing system 900. The first and the second sets of parameter values may be adjusted from their initial values based on a measurement of the force on the frame by vibrations of the voice coils 111A/B and 112A/B (which may be excited by the output audio signals processed from the test input audio signals). The first and the second sets of parameter values are determined if it is found that the force on the frame is cancelled out completely or reduced to a desired level. During the adjustment of the two sets of parameter values, a force sensor may be used to sense the magnitude of the force on the frame or on other part of the speaker system that is directly or indirectly connected to the frame.

In some example embodiments, the third set of parameter values applied in the response flattening subsystem 930 may also be determined after the transducer assembly 100 has been mounted into the chamber of the speaker system, by applying one or more test input audio signals into the signal processing system 900. The third set of parameter values may be iteratively adjusted from their initial values, until it is determined that the frequency response of the speaker system is substantially flat.

In some example embodiments, the first and second sets of parameter values applied in the vibration cancellation system 905 may be determined first, to ensure that the undesired vibration of the speaker system can be cancelled or reduced to a desired level. After the first and second sets of parameter values are determined, the third set of parameter values applied in the response flattening subsystem 930 are determined to flatten the frequency response.

It should be appreciated that the pre-gain unit and the GEQ unit in the response flattening subsystem 930 and the GEQ unit, DRC unit, and limiter in the vibration cancellation subsystem 905 are illustrated for the purpose of illustration. In other embodiments, the response flattening subsystem 930 may include more, less, or different audio processing units to achieve a flat frequency response, and the vibration cancellation system 905 may include more, less, or different audio processing units to ensure that the vibration on the frame of the transducer assembly 100 can be cancelled or further reduced. In some cases, the components illustrated in FIG. 9 may be arranged in other ways as needed.

It is to be understood that the components of the system 900 may be a hardware module or a software unit module. For example, in some example embodiments, the system 900 may be implemented partially or completely as software and/or in firmware, for example, implemented as a computer program product embodied in a computer readable medium. Alternatively, or in addition, the system may be implemented partially or completely based on hardware, for example, as an integrated circuit (IC), an application-specific integrated circuit (ASIC), a system on chip (SOC), a field programmable gate array (FPGA), and so forth. The scope of the subject matter disclosed herein is not limited in this regard.

Figure 10:
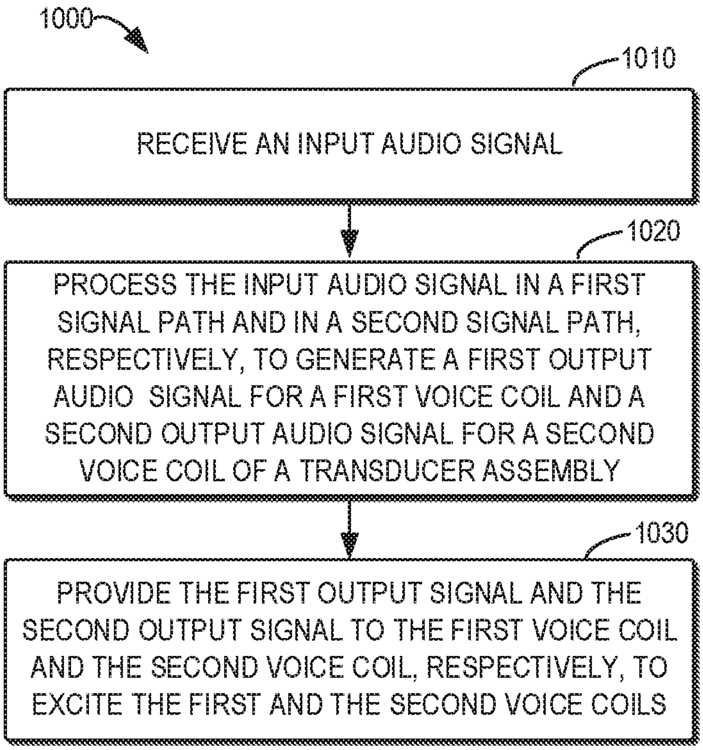
FIG. 10 illustrates a flowchart of a signal processing method in accordance with some example embodiments disclosed herein.

FIG. 10 illustrates a flowchart of a signal processing method 1000 in accordance with some example embodiments disclosed herein. The method 1000 may be implemented at the signal processing system 900 in FIG. 9, to generate output audio signals for the transducer assembly 100 according to the example embodiments disclosed herein.

At 1010, the signal processing system 900 receives an input audio signal, e.g., the input audio signal 902. In some example embodiments, the input audio signal may include a single-channel audio signal.

At 1020, the signal processing system 900 processes the input audio signal in a first signal path and in a second signal path, respectively, to generate a first output audio signal for a first voice coil and a second output audio signal for a second voice coil of a transducer assembly (e.g., the voice coils 111A/B and 112A/B of the transducer assembly 100).

In example embodiments disclosed herein, the first voice coil is connected to a first diaphragm plate and a first diaphragm of the transducer assembly and extends inwardly from the first diaphragm plate in a first direction, and the second voice coil is disposed to extend inwardly in a second direction opposite to the first direction, and wherein the first and the second voice coils have different sizes and are arranged in a telescopic arrangement. The processing in the first and second signal paths are performed, for example, by the vibration cancellation subsystem 905. The first and the second output audio signals are generated to have different energy levels.

In some example embodiments, a first gain adjustment may be performed on the input audio signal based on a first set of parameter values for the first signal path, to generate the first output audio signal, and a second gain adjustment may be performed on the input audio signal based on a second set of parameter values for the second signal path, to generate the second output audio signal. The second set of parameter values is different from the first set of parameter values. In some example embodiments, each of the first gain adjustment and the second gain adjustment may include at least one of graphic equalization (GEQ), dynamic range control (DRC), and gain limiting.

In some example embodiments, a third gain adjustment may be performed on the input audio signal based on a third set of parameter values, to flatten a frequency response for a speaker system into which the transducer assembly is mounted, to generate an intermediate audio signal. The intermediate audio signal may be further processed in the first signal path and in the second signal path, respectively, to generate the first output audio signal and the second output audio signal.

In some example embodiments, the first set of parameter values and the second set of parameter values may be determined to cause a cancellation of force on the frame by vibrations of the first and the second voice coils. In some example embodiments, the third set of parameter values may be determined after a first set of parameter values used for generating the first output audio signal in the first signal path and a second set of parameter values used for generating the second output audio signal in the second signal path are determined.

In some example embodiments, the first set of parameter values and the second set of parameter values may be determined after the transducer assembly has been mounted into a chamber of a speaker system.

With the first and the second output audio signals are generated, at 1030, the signal processing system 900 provides the first and the second output audio signals to the first voice coil and the second voice coil of the transducer assembly, respectively, to excite the first and the second voice coils.

Figure 11:
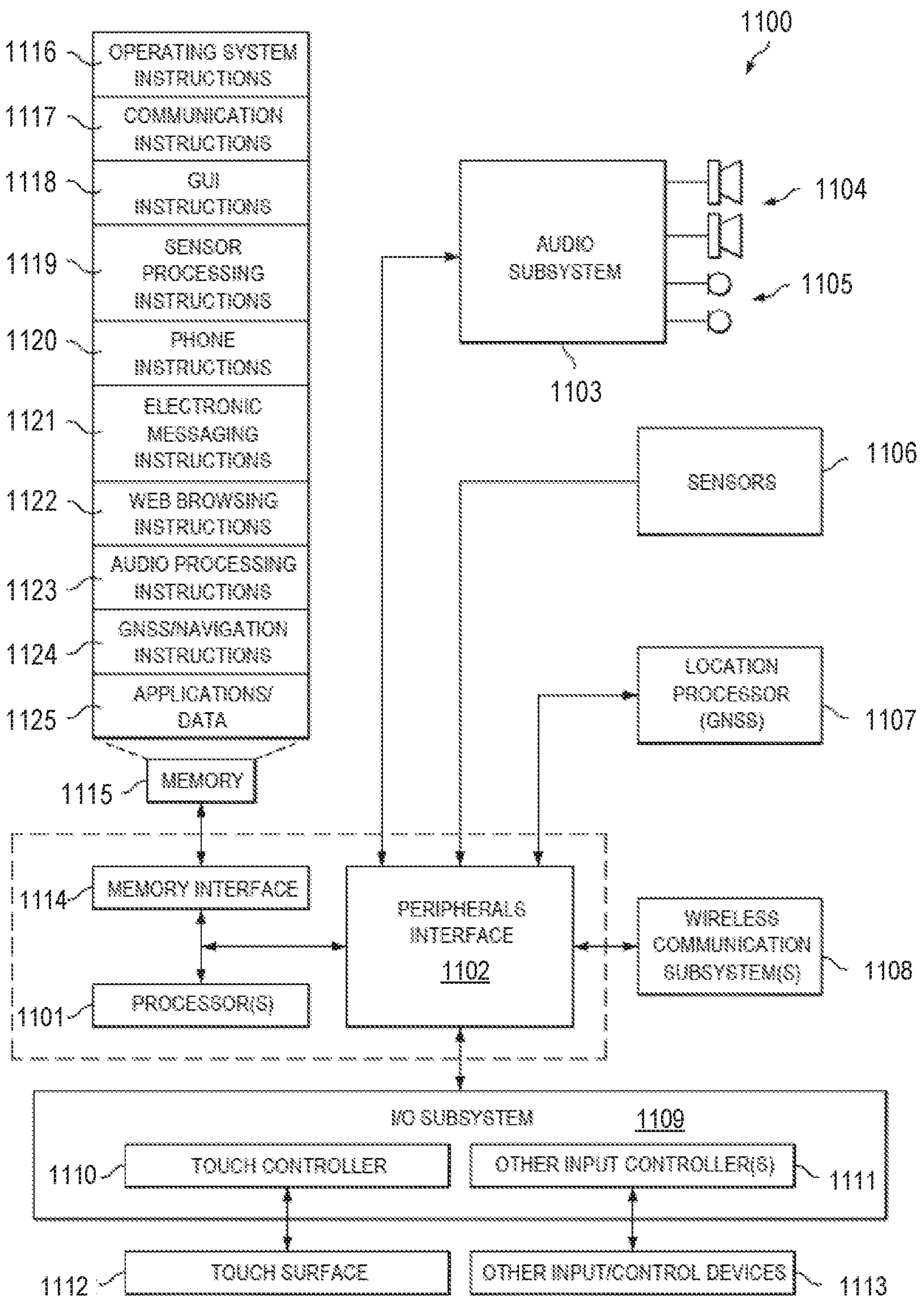
FIG. 11 illustrates a block diagram of electronic device architecture suitable for implementing example embodiments disclosed herein.

FIG. 11 illustrates a block diagram of electronic device architecture suitable for implementing the features and processes described in reference to FIGS. 1-10 according to some example embodiments. Architecture 1100 can be implemented in any electronic device, including but not limited to: a desktop computer, consumer audio/visual (AV) equipment, radio broadcast equipment, mobile devices (e.g., smartphone, tablet computer, laptop computer, or wearable device). In the example embodiment shown, architecture 1100 is for a smart phone and includes processor(s) 1101, peripherals interface 1102, audio subsystem 1103, loudspeakers 1104, microphone 1105, sensors 1106 (e.g., accelerometers, gyros, barometer, magnetometer, camera), location processor 1107 (e.g., GNSS receiver), wireless communications subsystems 1108 (e.g., Wi-Fi, Bluetooth, cellular) and I/O subsystem(s) 1109, which includes touch controller 1110 and other input controllers 1111, touch surface 1112 and other input/control devices 1113. Each of loudspeakers 1104 can implement a transducer assembly described above in reference to FIGS. 1-10. Other architectures with more or fewer components can also be used to implement the disclosed embodiments.

Memory interface 1114 is coupled to processors 1101, peripherals interface 1102 and memory 1115 (e.g., flash, RAM, ROM). Memory 1115 stores computer program instructions and data, including but not limited to: operating system instructions 1116, communication instructions 1117, GUI instructions 1118, sensor processing instructions 1119, phone instructions 1120, electronic messaging instructions 1121, web browsing instructions 1122, audio processing instructions 1123, GNSS/navigation instructions 1124 and applications/data 1125. Audio processing instructions 1123 include instructions for performing the audio processing described in reference to FIGS. 1-10.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods disclosed herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product including a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Computer program code for carrying out methods disclosed herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. Further, it is well known to the skilled person that communication media typically embodies computer readable instructions, data structures, program modules or other data in a modulated data signal such as a carrier wave or other transport mechanism and includes any information delivery media.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter disclosed herein or of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination.

It will be appreciated that the embodiments of the subject matter disclosed herein are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A transducer assembly comprising:

a first voice coil and a second voice coil, the first and the second voice coils having different sizes and being arranged in a telescopic arrangement;

a first suspension system connected to the first voice coil, the first voice coil being disposed to extend from the first suspension system in a first direction to a first plane that is orthogonal to the first direction;

a second suspension system connected to the second voice coil, the second voice coil being disposed to extend from the second suspension system in a second direction opposite to the first direction to a second plane that is orthogonal to the second direction;

a magnet system defining a first magnetic gap for at least partially receiving the first voice coil and a second magnetic gap for at least partially receiving the second voice coil;

a frame defining a space therein; and a yoke for at least partially attaching the magnet system to the frame, wherein the yoke has a wall extending along a first axis of the frame and has no wall extending along a second axis of the frame, the second axis being longer than the first axis, wherein the first plane and the second plane are the same plane.

2. The transducer assembly of claim 1, wherein respective wires of the first and the second voice coils are dimensioned according to respective magnetic flux densities in the first and the second magnetic gaps.

3. The transducer assembly of claim 1, wherein diameters of the respective wires of the first voice coil and the second voice coil are selected according to the respective magnetic flux densities in the first and the second magnetic gaps.

4. The transducer assembly of claim 1, wherein a first total weight of the first suspension system and the first voice coil is substantially equal to a second total weight of the second suspension system and the second voice coil.

5. The transducer assembly of claim 1, wherein the first suspension system comprises a first diaphragm plate and a first diaphragm covering a first open end of the frame.

6. The transducer assembly of claim 5, wherein the second suspension system comprises a second diaphragm plate and a second diaphragm covering a second open end opposite to the first open end of the frame.

7. The transducer assembly of claim 6, wherein the first diaphragm and the second diaphragm are manufactured to have substantially the same mechanical compliance, mechanical stiffness, and/or mechanical resistance.

8. The transducer assembly of claim 5, wherein the second suspension system comprises a flexible suspension member suspending from the frame.

9. The transducer assembly of claim 1, wherein the first voice coil and the second voice coil are operable to vibrate by a first output audio signal and a second output audio signal, respectively, the first and the second output audio signals being generated from an input audio signal and having different energy levels.

10. The transducer assembly of claim 1, wherein the first and the second voice coils are connected to the frame via the first suspension system and the second suspension system, respectively, wherein the first voice coil extends beyond the first plane in the first direction, and wherein the second voice coil extends beyond the second plane in the second direction.

11. A speaker system comprising:

a transducer assembly according to claim 1; and a signal processing system configured to perform a signal processing method comprising:

receiving an input audio signal;

processing the input audio signal in a first signal path and in a second signal path, respectively, to generate a first output audio signal for the first voice coil and a second output audio signal for the second voice coil of the transducer assembly, the first and the second output audio signals having different energy levels; and providing the first output audio signal and the second output audio signal to the first voice coil and the second voice coil, respectively, to excite the first and the second voice coils.

12. The speaker system of claim 11, wherein the input audio signal comprises a single-channel audio signal.

13. The speaker system of claim 11, wherein processing the input audio signal comprises:

performing a first gain adjustment on the input audio signal based on a first set of parameter values for the first signal path, to generate the first output audio signal; and performing a second gain adjustment on the input audio signal based on a second set of parameter values for the second signal path, to generate the second output audio signal, the second set of parameter values being different from the first set of parameter values.

14. The speaker system of claim 11, wherein processing the input audio signal comprises:

performing, based on a third set of parameter values, a third gain adjustment on the input audio signal to flatten a frequency response for a speaker system into which the transducer assembly is mounted, to generate an intermediate audio signal; and processing the intermediate audio signal in the first signal path and in the second signal path, respectively, to generate the first output audio signal and the second output audio signal.

15. A transducer assembly comprising:

a first voice coil and a second voice coil, the first and the second voice coils having a same size and being arranged in an opposite and lengthwise offset arrangement;

a first suspension system connected to the first voice coil, the first voice coil being disposed to extend from the first suspension system in a first direction to a first plane that is orthogonal to the first direction;

a second suspension system connected to the second voice coil, the second voice coil being disposed to extend from the second suspension system in a second direction opposite to the first direction to a second plane that is orthogonal to the second direction;

a magnet system defining a first magnetic gap for at least partially receiving the first voice coil and a second magnetic gap for at least partially receiving the second voice coil;

a frame defining a space therein; and a yoke for at least partially attaching the magnet system to the frame, wherein the yoke has a wall extending along a first axis of the frame and has no wall extending along a second axis of the frame, the second axis being longer than the first axis, wherein the first plane and the second plane are the same plane.

16. The transducer assembly of claim 15, wherein respective wires of the first and the second voice coils are dimensioned according to respective magnetic flux densities in the first and the second magnetic gaps.

17. The transducer assembly of claim 15, wherein diameters of the respective wires of the first voice coil and the second voice coil are selected according to the respective magnetic flux densities in the first and the second magnetic gaps.

18. The transducer assembly of claim 15, wherein a first total weight of the first suspension system and the first voice coil is substantially equal to a second total weight of the second suspension system and the second voice coil.

19. The transducer assembly of claim 15, wherein the first suspension system comprises a first diaphragm plate and a first diaphragm covering a first open end of the frame.

20. The transducer assembly of claim 19, wherein the second suspension system comprises a second diaphragm plate and a second diaphragm covering a second open end opposite to the first open end of the frame.

21. The transducer assembly of claim 20, wherein the first diaphragm and the second diaphragm are manufactured to have substantially the same mechanical compliance, mechanical stiffness, and/or mechanical resistance.

22. The transducer assembly of claim 19, wherein the second suspension system comprises a flexible suspension member suspending from the frame.

23. The transducer assembly of claim 15, wherein the first voice coil and the second voice coil are operable to vibrate by a first output audio signal and a second output audio signal, respectively, the first and the second output audio signals being generated from an input audio signal and having different energy levels.

24. The transducer assembly of claim 15, wherein the first and the second voice coils are connected to the frame via the first suspension system and the second suspension system, respectively, wherein the first voice coil extends beyond the first plane in the first direction, and wherein the second voice coil extends beyond the second plane in the second direction.

25. A speaker system comprising:

a transducer assembly according to claim 15; and a signal processing system configured to perform a signal processing method comprising:

receiving an input audio signal;

processing the input audio signal in a first signal path and in a second signal path, respectively, to generate a first output audio signal for the first voice coil and a second output audio signal for the second voice coil of the transducer assembly, the first and the second output audio signals having different energy levels; and providing the first output audio signal and the second output audio signal to the first voice coil and the second voice coil, respectively, to excite the first and the second voice coils.

26. The speaker system of claim 25, wherein processing the input audio signal comprises:

performing a first gain adjustment on the input audio signal based on a first set of parameter values for the first signal path, to generate the first output audio signal; and performing a second gain adjustment on the input audio signal based on a second set of parameter values for the second signal path, to generate the second output audio signal, the second set of parameter values being different from the first set of parameter values.

27. The speaker system of claim 25, wherein processing the input audio signal comprises:

performing, based on a third set of parameter values, a third gain adjustment on the input audio signal to flatten a frequency response for a speaker system into which the transducer assembly is mounted, to generate an intermediate audio signal; and processing the intermediate audio signal in the first signal path and in the second signal path, respectively, to generate the first output audio signal and the second output audio signal.

28. The speaker system of claim 25, wherein the input audio signal comprises a single-channel audio signal.

* * * * *